(12) United States Patent
Chen et al.

(10) Patent No.: US 10,498,640 B2
(45) Date of Patent: *Dec. 3, 2019

(54) PCE FOR TEMPORAL TUNNEL SERVICES

(71) Applicant: Futurewei Technologies, Inc., Plano, TX (US)

(72) Inventors: Huaimo Chen, Bolton, MA (US); Charles E. Perkins, Saratoga, CA (US)

(73) Assignee: Futurewei Technologies, Inc., Plano, TX (US)

( * ) Notice: Subject to any disclaimer, the term of this patent is extended or adjusted under 35 U.S.C. 154(b) by 24 days.

This patent is subject to a terminal disclaimer.

(21) Appl. No.: 14/846,450

(22) Filed: Sep. 4, 2015

(65) Prior Publication Data

US 2017/0070426 A1    Mar. 9, 2017

(51) Int. Cl.
 H04L 12/28    (2006.01)
 H04L 12/723    (2013.01)
 H04L 12/721    (2013.01)

(52) U.S. Cl.
 CPC .............. *H04L 45/50* (2013.01); *H04L 45/44* (2013.01)

(58) Field of Classification Search
 CPC ................................ H04L 45/50; H04L 45/44
 USPC ......................................................... 370/389
 See application file for complete search history.

(56) References Cited

U.S. PATENT DOCUMENTS

| 7,319,700 | B1 | 1/2008 | Kompella |
| 8,107,379 | B2 | 1/2012 | Vasseur |
| 8,717,899 | B2 | 5/2014 | Boutros et al. |
| 9,258,210 | B2 | 2/2016 | Torvi |
| 9,819,580 | B2 | 11/2017 | Chen et al. |
| 2002/0176370 | A1 | 11/2002 | Ohba |
| 2004/0042406 | A1 | 3/2004 | Wu et al. |
| 2004/0073650 | A1 | 4/2004 | Nakamura |
| 2005/0089327 | A1* | 4/2005 | Ovadia ................... H04L 45/04 398/47 |
| 2006/0013177 | A1 | 1/2006 | Saito |
| 2006/0101142 | A1* | 5/2006 | Vasseur ................... H04L 45/04 709/225 |
| 2007/0160061 | A1 | 7/2007 | Vasseur |

(Continued)

OTHER PUBLICATIONS

Liu et al., "Extensions to PCEP for temporal LSP", Jul. 2, 2015 (From Applicant's IDS filed on Sep. 4, 2015).*

(Continued)

*Primary Examiner* — Mang Hang Yeung
(74) *Attorney, Agent, or Firm* — Conley Rose, P.C.

(57) ABSTRACT

An apparatus comprising a receiver configured to receive a first path computation request (PCReq) message from a path computation client (PCC) requesting path computation for a label switched path (LSP) in a network, wherein the PCReq message indicates a time interval scheduled for the LSP to carry traffic, a processor coupled to the receiver and configured to compute a path in the network for the LSP by determining that the path satisfies a network constraint in the scheduled time interval, and reserve a network resource on a link along the path computed for the LSP, wherein the network resource is reserved in advance for the scheduled time interval, and a transmitter coupled to the processor and configured to send a path computation response (PCRep) message to the PCC indicating the path computed for the LSP in the scheduled time interval.

25 Claims, 29 Drawing Sheets

(56) References Cited

U.S. PATENT DOCUMENTS

| | | | |
|---|---|---|---|
| 2007/0165515 | A1 | 7/2007 | Vasseur |
| 2008/0123533 | A1 | 5/2008 | Vasseur et al. |
| 2008/0304501 | A1 | 5/2008 | Park et al. |
| 2009/0274464 | A1 | 11/2009 | Zi et al. |
| 2010/0220996 | A1 | 9/2010 | Lee et al. |
| 2011/0090785 | A1 | 4/2011 | Shimizu et al. |
| 2012/0092986 | A1* | 4/2012 | Chen ............... H04L 45/22 370/228 |
| 2012/0147895 | A1 | 6/2012 | Choudhury et al. |
| 2013/0034103 | A1* | 2/2013 | Chen ............... H04L 45/124 370/400 |
| 2013/0242977 | A1 | 9/2013 | Tanaka |
| 2015/0110000 | A1 | 4/2015 | Zhang et al. |
| 2015/0245392 | A1 | 8/2015 | Chan et al. |
| 2016/0308786 | A1 | 10/2016 | Chen et al. |
| 2016/0344626 | A1 | 11/2016 | Chen et al. |
| 2017/0332423 | A9 | 11/2017 | Iyer et al. |
| 2018/0019930 | A1* | 1/2018 | Bruno ............... H04L 41/147 |

OTHER PUBLICATIONS

Bradner, S., "Key words for use in RFCs to Indicate Requirement Levels," RFC 2119, Mar. 1997, 3 pages.

Awduche, D., "RSVP-TE: Extensions to RSVP for LSP Tunnels," RFC 3209, Dec. 2001, 61 pages.

Farrel, A., "A Path Computation Element (PCE)—Based Architecture," RFC 4655, Aug. 2006, 40 pages.

Le Roux, J., "OSPF Protocol Extensions for Path Computation Element (PCE) Discovery," RFC 5088, Jan. 2008, 21 pages.

Le Roux, J., "Is-Is Protocol Extensions for Path Computation Element (PCE) Discovery," RFC 5089, Jan. 2008, 18 pages.

Vasseur, J., "Path Computation Element (PCE) Communication Protocol (PCEP)," RFC 5440, Mar. 2009, 87 pages.

Yasukawa, S., "Path Computation Clients (PCC)—Path Computation Element (PCE) Requirements for Point-to Multipoint MPLS-TE," RFC 5862, Jun. 2010, 11 pages.

Zhao, Q., "Extensions to the Path Computation Element Communication Protocol (PCEP) for Point-to-Multipoint Traffic Engineering Label Switched Paths," RFC 6006, Sep. 2010, 33 pages.

Crabbe, E., "PCEP Extensions for PCE-initiated LSP Setup in a Stateful PCE Model," draft-ietf-pce-pce-initiated-lsp-04, Apr. 17, 2015, 17 pages.

Crabbe, E., "PCEP Extensions for Stateful PCE," draft-ietf-pce-stateful-pce-11, Apr. 20, 2015, 47 pages.

Chen, H., "Extensions to PCEP for Temporal LSP," draft-chen-pce-tts-00.txt, Jul. 2, 2015, 23 pages.

Chen, et al., "Framework for Temporal Tunnel Services, "draft-chen-teas-frmwk-tts-01.txt, Sep. 22, 2016, 25 pages.

Crabbe, et al., "PCEP Extensions for Stateful PCE," draft-ietf-pce-stateful-pce-14, Sep. 21, 2016, 51 pages.

Chen, et al., "Zone Routing System," U.S. Appl. No. 14/737,142 filed Jun. 11, 2015, Attorney docket 4502-04400, 43 pages Specification, 22 pages drawings.

Moy, "OSPF Version 2," RFC 2328, Apr. 1998, 201 pages.

Rosen, et al., "Multiprotocol Label Switching Architecture," RFC 3031, Jan. 2001, 61 pages.

Berger, et al., "The OSPF Opaque LSA Option," RFC 5250, Jul. 2008, 17 pages.

Chen, H., et al., "Extensions to MPLS for Temporal LSP," draft-chen-teas-rsvp-tts-oo.txt, Jul. 3, 2015, 12 pages.

Katz, D., et al., "Traffic Engineering (TE) Extensions to OSPF Version 2," RFC 3630, Sep. 2003, 14 pages.

Aggarwal, R., Ed., et al., "Extensions to Resource Reservation Protocol-Traffic Engineering (RSVP-TE) for Point-to-Multipoint TE Label Switched Paths (LSPs)," RFC 4875, May 2007, 53 pages.

Coltun, R., "The OSPF Opaque LSA Option," RFC 2370, Jul. 1998, 15 pages.

Office Action dated Jul. 6, 2018, 18 pages, U.S. Appl. No. 15/187,384, filed Jun. 20, 2016.

Office Action dated Feb. 28, 2018, 5 pages, U.S. Appl. No. 15/187,384, filed Jun. 20, 2016.

Office Action dated Nov. 9, 2018, 13 pages, U.S. Appl. No. 15/187,384, filed Jun. 20, 2016.

Notice of Allowance dated Apr. 12, 2019, 16 pages, U.S. Appl. No. 15/187,384, filed Jun. 20, 2016.

Office Action dated Feb. 22, 2018, 25 pages, U.S. Appl. No. 15/178,151, filed Jun. 9, 2016.

Office Action dated Jun. 6, 2018, 13 pages, U.S. Appl. No. 15/178,151, filed Jun. 9, 2016.

Notice of Allowance dated Sep. 24, 2018, 10 pages, U.S. Appl. No. 15/178,151, filed Jun. 9, 2016.

Office Action dated Oct. 20, 2017, 6 pages, U.S. Appl. No. 15/157,944, filed May 18, 2016.

Notice of Allowance dated Jan. 3, 2018, 9 pages, U.S. Appl. No. 15/157,944, filed May 18, 2016.

Notice of Allowance dated Sep. 1, 2017, 14 pages, U.S. Appl. No. 15/095,748, filed Apr. 11, 2016.

Office Action dated Apr. 11, 2018, 26 pages, U.S. Appl. No. 15/083,922, filed Mar. 29, 2016.

Office Action dated Oct. 18, 2017, 30 pages, U.S. Appl. No. 15/083,922, filed Mar. 29, 2016.

\* cited by examiner

PCE FOR TEMPORAL TUNNEL SERVICES

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Constraint-based path computation is an important component in Multiprotocol Label Switching (MPLS) networks. Path computation may be performed either at a management system, an ingress node, or a source node of a traffic flow. However, path computation in large, multi-domain, multi-region, and/or multi-layer networks is complex and computationally intensive and may require coordination between multiple network elements (NEs). A path computation architecture that decouples path computation from routers is described in an Internet Engineering Task Force (IETF) draft document Request For Comment (RFC) 4655.

SUMMARY

In one embodiment, the disclosure includes an apparatus comprising a receiver configured to receive a first path computation request (PCReq) message from a path computation client (PCC) requesting path computation for a label switched path (LSP) in a network, wherein the PCReq message indicates a time interval scheduled for the LSP to carry traffic, a processor coupled to the receiver and configured to compute a path in the network for the LSP by determining that the path satisfies a network constraint in the time interval, and reserve a network resource on a link along the path computed for the LSP, wherein the network resource is reserved in advance for the scheduled time interval, and a transmitter coupled to the processor and configured to send a path computation response (PCRep) message to the PCC indicating the path computed for the LSP in the time interval.

In another embodiment, the disclosure includes an apparatus comprising a processor configured to obtain one or more time intervals scheduled for an LSP to carry traffic in a network, a transmitter coupled to the processor and configured to send a PCReq message to a path computation element (PCE) to request path computation for the LSP according to the scheduled time intervals and a network constraint, a receiver coupled to the processor and configured to receive a PCRep message from the PCE indicating a path for the LSP satisfying the network constraint in the scheduled time interval and an in-advance reservation of network resource along the path for the LSP in the scheduled time interval.

In yet another embodiment, the disclosure includes a method comprising receiving, by a PCE, a request for creating a temporal LSP in a time interval, computing, by the PCE, a shortest path in a network satisfying a constraint for the LSP in the time interval, reserving, by the PCE, a bandwidth for the LSP along the shortest path in the time interval, and initiating creation of the LSP in the network to carry traffic in the time interval.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalent.

Figure 1:
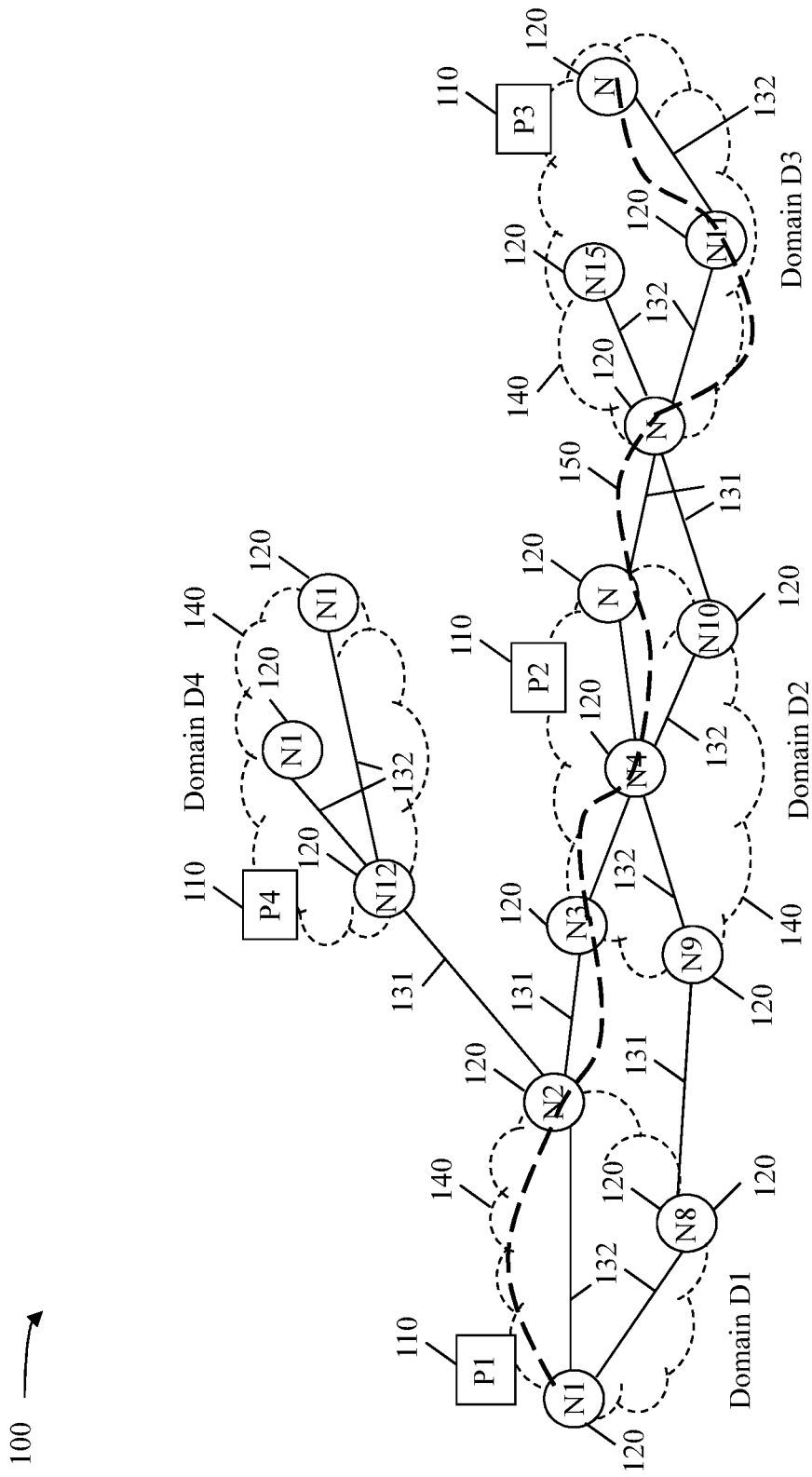
FIG. 1 is a schematic diagram of an embodiment of a multi-domain network.

FIG. 1 is a schematic diagram of an embodiment of a multi-domain network 100. The network 100 comprises a plurality of domains 140, depicted as Domains D1-D4, interconnected by a plurality of links 131. Each domain 140 comprises a plurality of network nodes 120, depicted as N1-N15, interconnected by a plurality of links 132. The links 131 and 132 may comprise physical links, such as fiber optic links and/or electrical links, logical links, or combinations thereof used to transport data. Each domain 140 operates under a common administrative entity. The domains 140 may employ different protocols, addressing schemes, and path computation algorithms. Each domain 140 manages network topology, policy, and network resources internal to the domain 140. In an embodiment, the domains 140 are secured domains, where network topology information, policy information, and network resource information are not shared across the domains 140. In one embodiment, the domains 140 correspond to autonomous systems (ASs) and/or autonomous areas, such as an interior gateway protocol (IGP) area. In another embodiment, the domains 140 correspond to network layers, such as an optical layer and an IP layer of the network 100. In order to facilitate traffic routing across the network 100 through multiple different domains 140, the network 100 may employ MPLS mechanisms to decouple network protocol dependencies among the domains 140. For example, an MPLS LSP may be established across any pair of network nodes 120 in the network 100 and subsequently traffic may be routed along the LSP based on an MPLS path label that identifies the LSP.

The network nodes 120 may be switches, routers, bridges, and/or any other network devices suitable for sending, receiving, and forwarding data in corresponding domains 140. The network nodes 120 may be internal nodes or border nodes. Internal nodes are network nodes 120 located within a domain 140, whereas border nodes are network nodes 120 located at an edge or a boundary of a domain 140 and may additionally be configured to communicate with other border network nodes 120 located in different domains. For example, in the domain D2 140, the network nodes N3, N5, N9, and N10 120 are border nodes and the network node N4 120 is an internal node.

The network 100 further comprises a plurality of PCEs 110, depicted as P1-P4. As shown, each PCE 110 is associated with a single domain 140. The PCEs 110 may be network devices, network management stations, applications, and virtual machines (VMs) configured to compute paths or routes in corresponding domains 140 based on network topology information, routing policy, and network resources of the corresponding domains 140. In some embodiments, a PCE 110 may be located within a network node 120 of a corresponding domain 140. In some other embodiments, a PCE 110 may be located on a server external to a corresponding domain 140. The PCEs 110 may perform constraint-based path computation, such as quality of service (QoS), bandwidths, delays, number of hops, and wavelengths. The PCEs 110 may compute constraint-based paths by employing an Open Shortest Path First (OSPF) algorithm. Network topology information, routing policy, and network resources of a domain 140 may be stored in one or more databases. In an embodiment, a traffic engineering database (TEDB) is employed for storing network resources of each links 132 in a domain 140 and each links 131 connected to the domain 140. For example, each PCE 110 maintains a TEDB for a corresponding domain 140.

In order to determine an end-to-end path for an LSP 150 across multiple domains 140, for example, from a source network node N1 120 to a destination network node N7 120, each PCE 110 may compute one or more paths across a corresponding domain 140. For example, the PCE P1 110 computes shortest paths from the source network node N1 120 to every border network node 120 (e.g., N2 and N8) in the domain D1 140 according to certain constraints. The PCE P2 110 computes shortest paths from every entry border network node 120 (e.g., N3 and N9) to every exit border network node 120 (e.g., N5 and N10) in the domain D2 140 according to the constraints. The PCE P3 110 computes shortest paths from every entry border network node 140 (e.g., N6) in the domain D3 140 to the destination network node N7 120 according to the constraints. Subsequently, a shortest path tree (SPT) is built by combining the shortest paths in each of the domains D1, D2, and D3 140 and an end-to-end path for the LSP 150 from the source network node N1 120 to the destination network node N7 120 may be selected from the SPT. In one embodiment, an end-to-end multi-domain path may be computed for an LSP 150 by employing an FSPC scheme, which begins path computation at a source domain 140 (e.g., D1). In another embodiment, an end-to-end multi-domain path may be computed for an LSP 150 by employing a BRPC scheme, which begins path computation at a destination domain 140 (e.g., D3). The FSPC scheme and the BRPC scheme are described more fully below. In some embodiments, the network nodes 120 may also act as an ingress for a connected external source node and/or an egress for a connected external destination node. In such embodiments, an end-to-end multi-domain path may be computed by employing similar mechanisms as described above.

In an embodiment, path computations in the network 100 are coordinated between a PCC and the PCEs 110. For example, path computation for the LSP 150 may be requested by a PCC of a headend (e.g., the source network node N1 120) of the LSP 150. The PCC may be implemented as a separate entity from the headend or as part of the headend. In such an embodiment, the PCEs 110 may advertise path computation capabilities to the PCC and/or exchange path computation capabilities with other PCEs 110 prior to path computations. Subsequently, the PCEs 110 may employ similar mechanisms described above to compute shortest paths for the LSP 150 in corresponding domains and the PCC may receive an end-to-end shortest path for the LSP 150 from a PCE 110. In an embodiment, the PCEs 110 and the PCC may communicate via a PCE communication protocol (PCEP) as described in an Internet Engineering Task Force (IETF) draft document Request for Comment (RFC) 5440 and PCEP extensions for PCE-initiated LSP set up. For example, the PCEP provides a PCReq message, a PCRep message, a path computation LSP initiate request (PCInitiate) message, and an LSP state report (PCRpt) message for LSP path computation, creation, and deletion, as described more fully below. In addition, the PCEs 110 and the PCC may employ OSPF protocol extensions as described in an IETF document RFC 5088 or Intermediate System to Intermediate System (IS-IS) protocol extensions as described in an IETF document RFC 5089, which are incorporated herein by reference, for performing PCE discovery. It should be noted that the network 100 may be configured as shown or alternatively configured as determined by a person of ordinary skill in the art to achieve similar functionalities.

Figure 2:
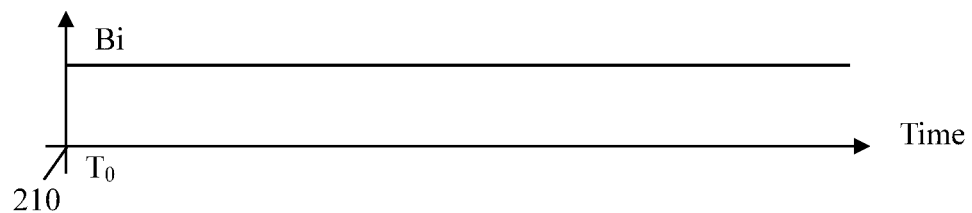
FIG. 2 is a timing diagram of an embodiment of a time agnostic bandwidth reservation scheme.

FIG. 2 is a timing diagram of an embodiment of a time agnostic bandwidth reservation scheme 200. The scheme 200 is employed by PCEs, such as the PCEs 110, to reserve bandwidths during path computations. In the scheme 200, the x-axis represents time in some arbitrary units. At a current time 210, denoted as $T_0$, a PCE calculates a path through a set of network nodes, such as the network nodes 120, interconnected by links, such as the links 131 and 132, and reserves a bandwidth, denoted as Bi, on each link based on given path computation constraints. As shown, the bandwidth, Bi, is reserved at the current time 210 when the path is calculated and remains reserved indefinitely in time. Thus, the scheme 200 is time agnostic. However, certain traffic may be active during certain time periods and inactive during other time periods. By reserving the bandwidth, Bi, indefinitely, other services or traffic may not be able to utilize the unused bandwidth during the inactive periods. As such, the scheme 200 may not utilize bandwidth efficiently. It should be noted that the scheme 200 is also employed by MPLS traffic engineering (TE) to reserve other types of network resources, such as wavelengths.

Disclosed herein are various embodiments for computing shortest paths for temporal LSPs. A temporal LSP is an LSP that is scheduled for carrying traffic in one or more time intervals. For example, many tunnel services are planned and scheduled. The disclosed embodiments provide mechanisms for reserving network resources for certain time intervals in advance. Thus, the disclosed embodiments enable efficient usage of network resources. For example, a PCC of an ingress, a user, or an application determines an upcoming time interval and a network constraint for an LSP. The network constraints may include bandwidths, delays, wavelength, and number of hops. The time interval comprises a pre-determined length of time. The time interval is a period of time from a start time to an end time. The start time and the end time may be represented by absolute times and/or relative times. The PCC sends a request to a PCE to request path computation for the LSP according to the time interval and the network constraints. The PCE computes a path for the LSP by determining that the path satisfies the network constraints in the time interval. In addition, the PCE reserves network resources in the time interval on each link of the path for the LSP according to the network constraints. Subsequently, the PCE coordinates with the PCC to set up the LSP at the start time of the time interval and to tear down the LSP at the end time of the time interval. In an embodiment, the PCC may schedule the LSP to carry traffic in a series of time intervals. In addition, the PCC may assign a period of time before and/or after the time interval for the LSP to carry traffic of a lower priority. Further, the PCC may allow the time interval to be shifted to an earlier time or a later time within a time range. After a temporal LSP is created, a user or an application may request to increase a duration of a scheduled time interval, to decrease a duration of a scheduled time interval, to add a new time interval, or to delete a scheduled time interval. In order to support temporal LSPs, the PCEP protocol, the OSPF protocol, and the IS-IS protocol may be extended to include timing information associated with the schedules of the temporal LSPs. It should be noted that the present disclosure describes the network resource reservation mechanisms in the context of bandwidth reservations. However, the disclosed embodiments may be suitable for reserving any types of network resources. The disclosed embodiments may be employed for initiating and maintaining temporal point-to-point (P2P) LSPs and temporal point-to-multipoint (P2MP) LSPs, for example as discussed in IETF document draft-chen-pce-tts-00, which is incorporated herein by reference.

Figure 3:
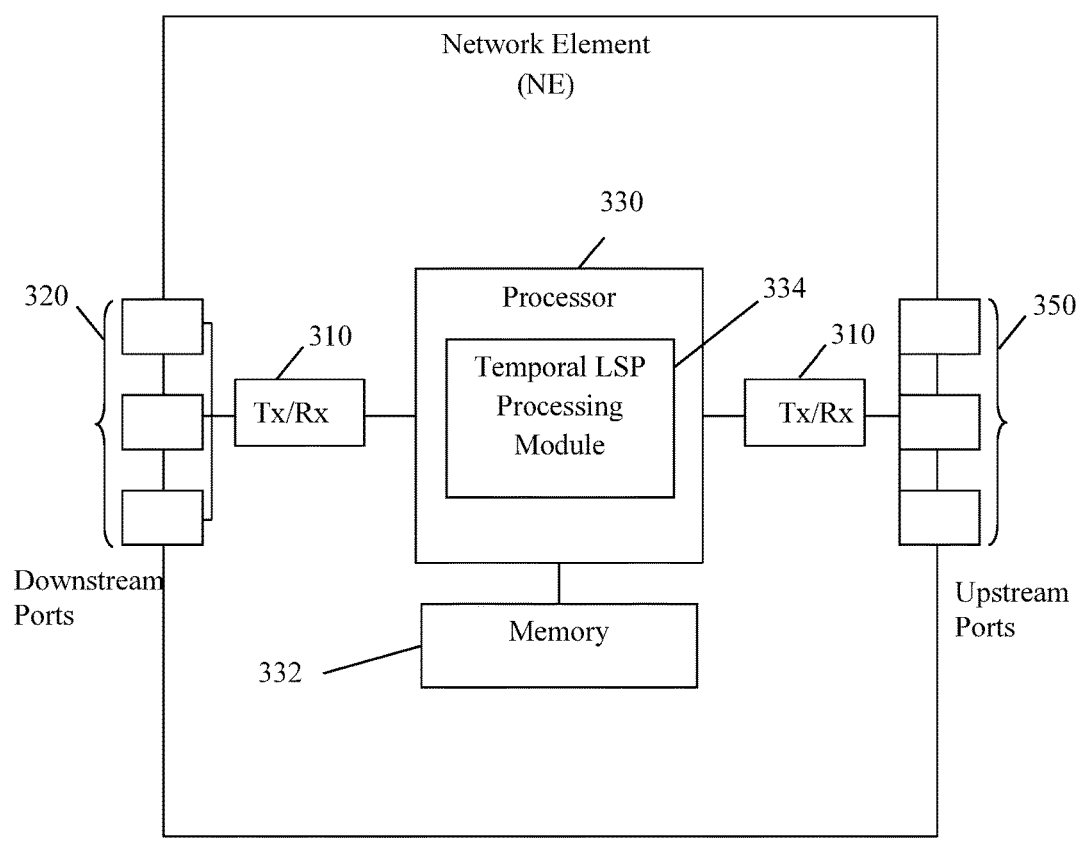
FIG. 3 is a schematic diagram of an embodiment of a network element (NE).

FIG. 3 is a schematic diagram of an embodiment of an NE 300. The NE 300 may act as a node, such as the PCE 110 and the network node 120 in the network 100 and a PCC. NE 300 may be configured to implement and/or support the temporal LSP creation and deletion mechanisms and the temporal LSP path computation mechanism described herein. NE 300 may be implemented in a single node or the functionality of NE 300 may be implemented in a plurality of nodes. One skilled in the art will recognize that the term NE encompasses a broad range of devices of which NE 300 is merely an example. NE 300 is included for purposes of clarity of discussion, but is in no way meant to limit the application of the present disclosure to a particular NE embodiment or class of NE embodiments. At least some of the features and/or methods described in the disclosure may be implemented in a network apparatus or module such as an NE 300. For instance, the features and/or methods in the disclosure may be implemented using hardware, firmware, and/or software installed to run on hardware.

As shown in FIG. 3, the NE 300 may comprise transceivers (Tx/Rx) 310, which may be transmitters, receivers, or combinations thereof. A Tx/Rx 310 may be coupled to plurality of downstream ports 320 for transmitting and/or receiving frames from other nodes and a Tx/Rx 310 may be coupled to plurality of upstream ports 350 for transmitting and/or receiving frames from other nodes, correspondingly. A processor 330 may be coupled to each Tx/Rx 310 to process the frames and/or determine which nodes to send the frames to. The processor 330 may comprise one or more multi-core processors and/or memory devices 332, which may function as data stores, buffers, etc. The processor 330 may be implemented as a general processor or may be part of one or more application specific integrated circuits (ASICs) and/or digital signal processors (DSPs). The processor 330 may comprise a temporal LSP processing module 334, which may perform processing functions of a network node, a PCE, or an PCC depending on the embodiments and may implement methods 900, 1000, 1100, 1200, 1300, and 1400, as discussed more fully below, and/or any other scheme and method discussed herein. As such, the inclusion of the temporal LSP processing module 334 and associated methods and systems provide improvements to the functionality of the NE 300. Further, the temporal LSP processing module 334 effects a transformation of a particular article (e.g., the network) to a different state. In an alternative embodiment, the temporal LSP processing module 334 may be implemented as instructions stored in the memory devices 332, which may be executed by the processor 330. The memory device 332 may comprise a cache for temporarily storing content, e.g., a random-access memory (RAM). Additionally, the memory device 332 may comprise a long-term storage for storing content relatively longer, e.g., a read-only memory (ROM). For instance, the cache and the long-term storage may include dynamic RAMs (DRAMs), solid-state drives (SSDs), hard disks, or combinations thereof. The memory device 332 may be configured to store one or more TEDBs.

It is understood that by programming and/or loading executable instructions onto the NE 300, at least one of the processor 330 and/or memory device 332 are changed, transforming the NE 300 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable and that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

Figure 4:
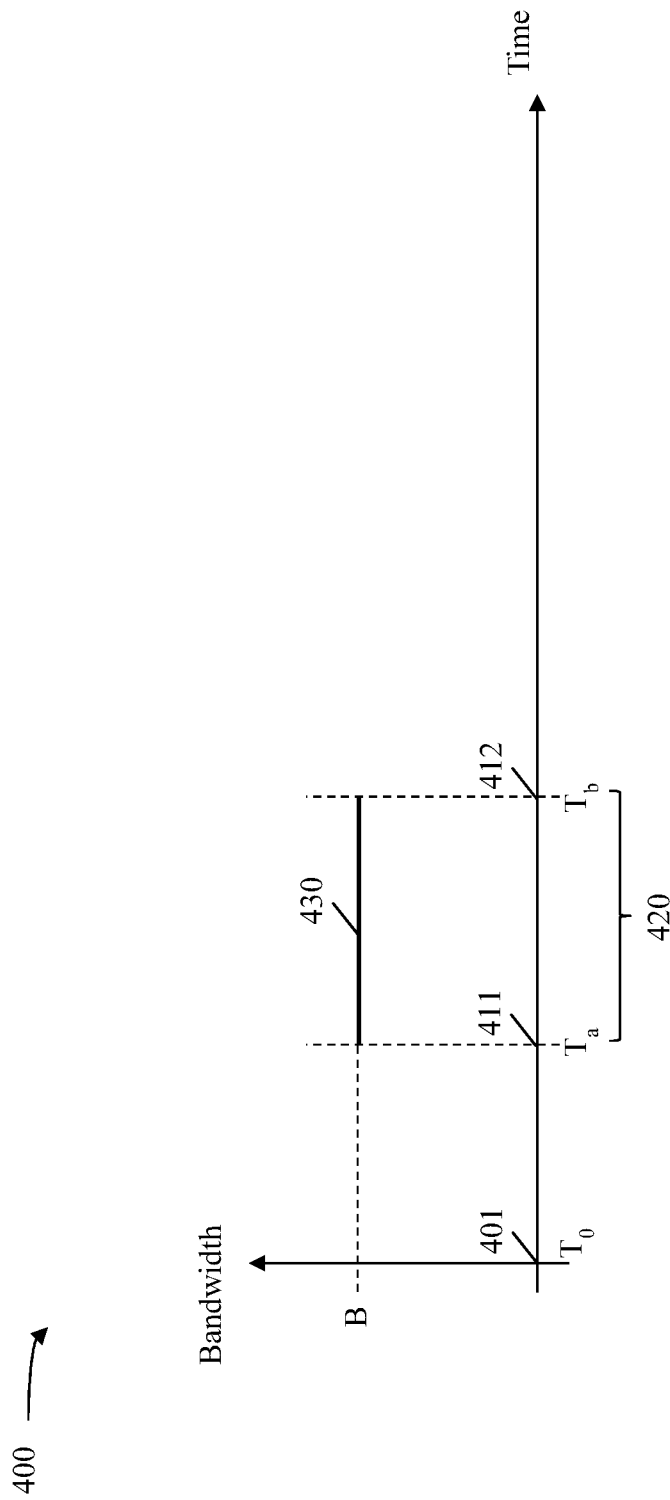
FIG. 4 is a timing diagram of an embodiment of a temporal bandwidth reservation scheme.

FIG. 4 is a timing diagram of an embodiment of a temporal bandwidth reservation scheme 400. In the scheme 400, the x-axis represents time in some arbitrary units of time and the y-axis represents bandwidth in some arbitrary units of bandwidth. The scheme 400 is employed by a PCE, such as the PCEs 110, and a PCC of an ingress, such as the source network node N1 120, in a network, such as the network 100, to reserve a bandwidth for an LSP, such as the LSP 150. For example, at a current time 401, denoted as $T_0$, a PCC may send a request message to a PCE to request path computation for an LSP in a time interval 420 according to certain network constraints including a constraint for a bandwidth 430 in an amount of B. In response to the request message, the PCE computes a path for the LSP satisfying the network constraints and reserves the bandwidth 430 for the LSP in the requested time interval 420. Subsequently, the LSP is configured is to carry traffic in the time interval 420. As shown, the time interval 420 starts at a time 411, denoted as $T_a$, and ends at a time 412, denoted as $T_b$. Thus, a time schedule for the scheme 400 may be represented as $[T_a, T_b]$. The PCC may include the time schedule in the request message by indicating an absolute time for the time 411, an absolute time for the time 412, a relative time for the time 411, a relative time for the time 412, a duration of the interval 420, or combinations thereof, as described more fully below. It should be noted that although the scheme 400 illustrates scheduling mechanisms for bandwidth reservation, the scheme 400 may be employed for reserving other types of network resources, such as wavelengths, for the LSP.

Figure 5:
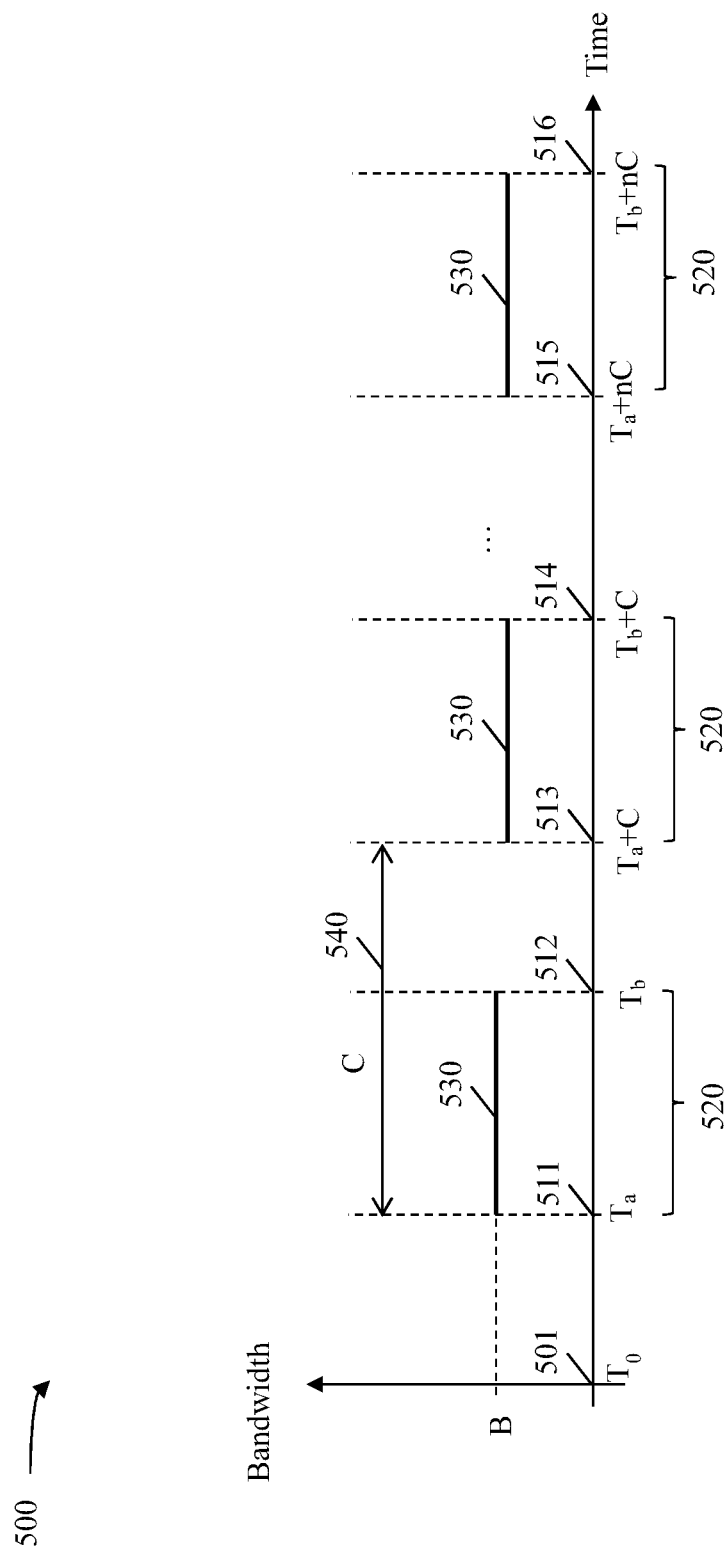
FIG. 5 is a timing diagram of an embodiment of a temporal bandwidth reservation scheme with a recurrent time interval.

FIG. 5 is a timing diagram of an embodiment of a temporal bandwidth reservation scheme 500 with a recurrent time interval. In the scheme 500, the x-axis represents time in some arbitrary units of time and the y-axis represents bandwidth in some arbitrary units of bandwidth. The scheme 500 is employed by a PCE, such as the PCEs 110, and a PCC of an ingress, such as the source network node N1 120, in a network, such as the network 100, to reserve a bandwidth for an LSP, such as the LSP 150. The scheme 500 is similar to the scheme 400, but reserves a bandwidth repeatedly over a series of time intervals 520. For example, at a current time 501, denoted as $T_0$, a PCC may send a request message to a PCE to request path computation for an LSP in a series of time intervals 520 with a repeat cycle 540, denoted as C, according to certain network constraints including as a constraint for a bandwidth 530 in an amount of B. In response to the request message, the PCE computes a path for the LSP satisfying the network constraints and reserves the bandwidth 530 in the requested time intervals 520. Subsequently, the LSP is configured to carry traffic in each of the time intervals 520. As shown, a first of the time intervals 520 begins at a time 511, denoted as $T_a$, and ends at a time 512, denoted as $T_b$. A second of the time intervals 520 begins at a time 513, denoted as $T_a+C$, to time 514, denoted as $T_b+C$. Thus, a time schedule for the scheme 500 may be represented as shown below:

$$[T_a, T_b], [T_a+C, T_b+C], \ldots, [T_a+n \times C, T_b+n \times C],$$

where n represents the number of repeats.

The PCC may include the time schedule in the request message by indicating an absolute time for the time 511, an absolute time for the time 512, a relative time for the time 511, a relative time for the time 512, a duration of the interval 520, a duration of the repeat cycle 540, a number of repeats (e.g., n+1), or combinations thereof, as described more fully below. It should be noted that although the scheme 500 illustrates scheduling mechanisms for bandwidth reservation, the scheme 500 may be employed for reserving other types of network resources, such as wavelengths, for LSPs.

Figure 6:
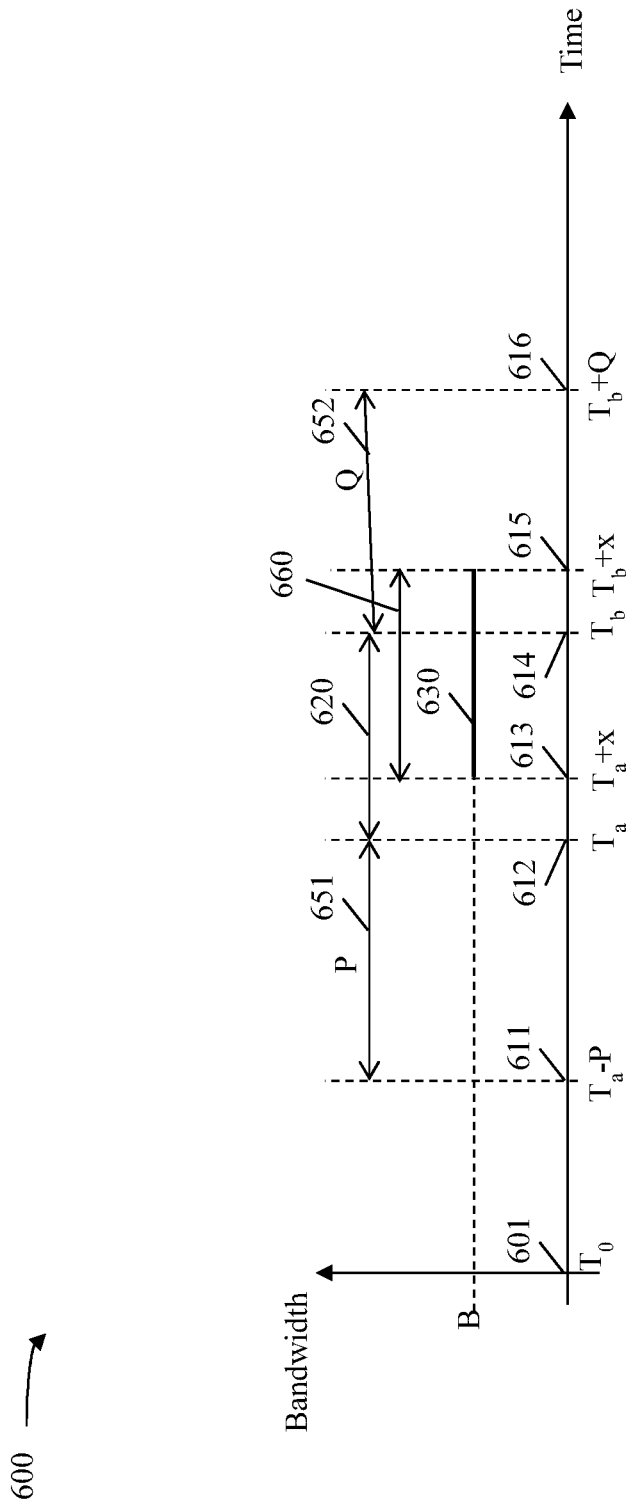
FIG. 6 is a timing diagram of an embodiment of a temporal bandwidth reservation scheme with an elastic time range.

FIG. 6 is a timing diagram of an embodiment of a temporal bandwidth reservation scheme 600 with an elastic time range. In the scheme 600, the x-axis represents time in some arbitrary units of time and the y-axis represents bandwidth in some arbitrary units of bandwidth. The scheme 600 is employed by a PCE, such as the PCEs 110, and a PCC of an ingress, such as the source network node N1 120, in a network, such as the network 100, to reserve a bandwidth for an LSP, such as the LSP 150. The scheme 600 is similar to the scheme 400, but reserves bandwidth in a time interval 620 with an elastic range. For example, at a current time 601, denoted as $T_0$, a PCC may send a request message to a PCE to request path computation for an LSP in a time interval 620 with an elastic time range according to certain network constraints including a constraint for a bandwidth 630 in an amount of B. The elastic time range may be represented by an elastic range lower bound 651, denoted as P, and an elastic range upper bound 652, denoted as Q. The elastic range lower bound 651 and the elastic range upper bound 652 may comprise time durations of about 300 seconds. In response to the request message, the PCE computes a path for the LSP satisfying the bandwidth 630 constraint and reserves a bandwidth 630 for the LSP as close to the requested time interval 620 as possible bounded by the elastic range lower bound 651 and the elastic range upper bound 652. Subsequently, the LSP is configured to carry traffic in a reserved time interval 660. As shown, the requested time interval 620 spans a time duration between a time 612, denoted as $T_a$, and a time 614, denoted as $T_b$. However, the scheme 600 allows the bandwidth to be reserved beginning at a time 611, denoted as $T_a-P$, or ending at a time 616, denoted as $T_b+Q$. As shown, a bandwidth 630 is reserved between a time 613, denoted as $T_a+x$, and a time 614, denoted as $T_b+x$, where x satisfies the elastic range lower bound 651 and the elastic range upper bound 652. Thus, a time schedule for the scheme 600 may be represented as shown below:

$[T_a+x, T_b+x]$, where $-P \leq x \leq Q$ and x represents a minimum amount of time from −P to Q that is required to shift requested time interval 620 in order to satisfy the requested constraints.

The PCC may include the time schedule in the request message by indicating an absolute time for the time 612, an absolute time for the time 614, a relative time for the time 612, a relative time for the time 614, a duration of the interval 620, a duration of the elastic range lower bound 651, a duration of the elastic range upper bound 652, or combinations thereof, as described more fully below. The set up and tear down of LSP in each of the time intervals 660 may be coordinated between the PCE and the PCC, as described more fully below. It should be noted that although the scheme 600 illustrates scheduling mechanisms for bandwidth reservation, the scheme 600 may be employed for reserving other types of network resources, such as wavelengths, for LSPs.

Figure 7:
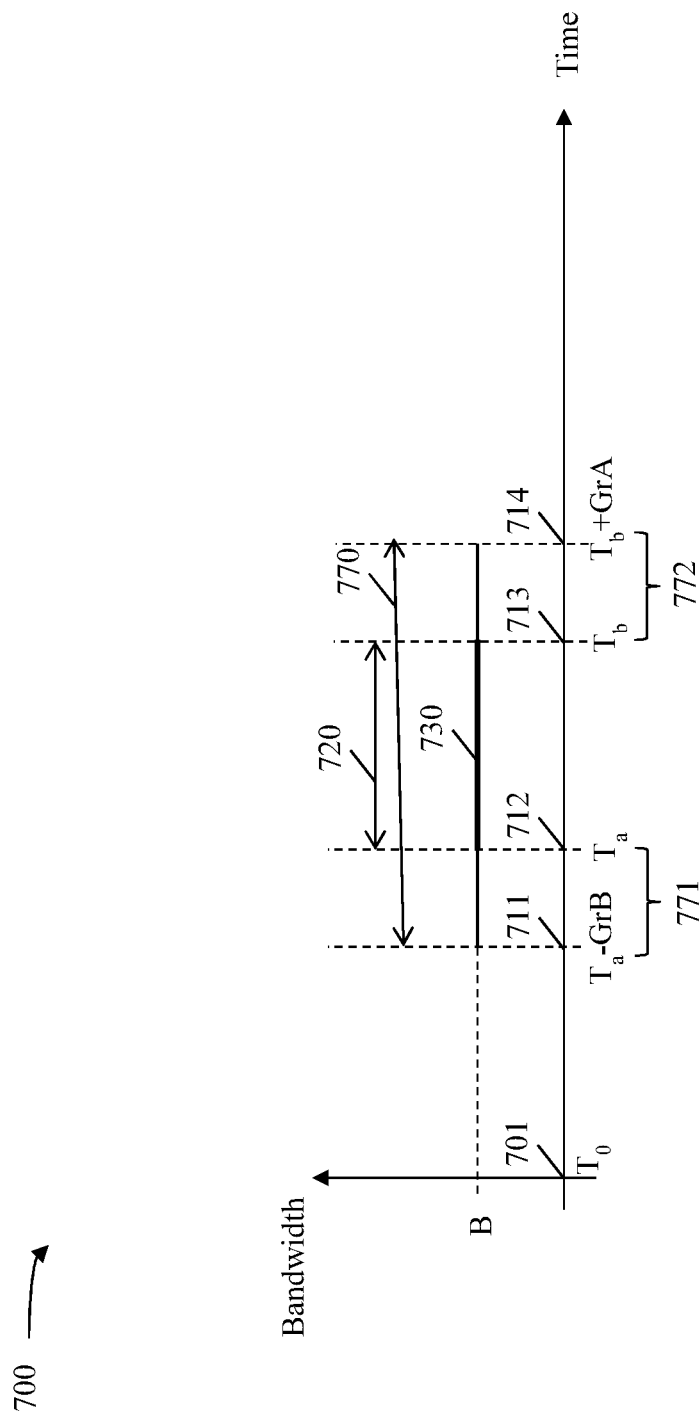
FIG. 7 is a timing diagram of an embodiment of a temporal bandwidth reservation scheme with graceful periods.

FIG. 7 is a timing diagram of an embodiment of a temporal bandwidth reservation scheme 700 with graceful periods 771 and 772. In the scheme 700, the x-axis represents time in some arbitrary units of time and the y-axis represents bandwidth in some arbitrary units of bandwidth. The scheme 700 is employed by a PCE, such as the PCEs 110, and a PCC of an ingress, such as the source network node N1 120, in a network, such as the network 100, to reserve a bandwidth for an LSP, such as the LSP 150. The scheme 700 is similar to the scheme 400, but allows an LSP to carry traffic for a graceful period 771 prior to a reserved time interval 720 and a graceful period 772 after the reserved time interval 720. The graceful period 771 prior to the reserved time interval 720 is referred to as a graceful-before (GrB) period and the graceful period 772 after the reserved time interval 720 is referred to as a graceful-after (GrA) period. For example, at a current time 701, denoted as $T_0$, a PCC may send a request message to a PCE to request path computation for an LSP in a time interval 720 with a graceful period 771 prior to the time interval 720 and a graceful period 772 after the time interval 720 according to certain network constraints including a constraint for a bandwidth 730 in an amount of B. The graceful periods 771 and 772 are time periods where traffic may be transported over the LSP, but the requested bandwidth 730 may not be guaranteed. For example, traffic may be carried along the LSP in the graceful periods 771 and 772 based on best effort or the LSP may transport traffic at a lower priority. In one embodiment, in response to the request message, the PCE computes a path for the LSP satisfying the network constraints and reserves a bandwidth 730 for the LSP in the time interval 720. Subsequently, the LSP is configured is to carry traffic in a time interval 770 including the reserved time interval 720 and the graceful periods 771 and 772. As shown, the time interval 720 begins at a time 712, denoted as $T_a$, and ends at a time 713, denoted as $T_b$. The time interval 770 begins at a time 711, denoted as $T_a-GrB$, and ends at a time 714, denoted as $T_b+GrA$. For example, the graceful periods 771 and 772 may comprise durations of about 60 seconds. It should be noted that, although the LSP may carry traffic during the graceful periods 771 and 772, the bandwidth 730 is reserved for the time interval 720, but not for the graceful periods 770. Thus, a time schedule for the scheme 700 may be represented as shown below:

$[T_a, T_b]$ with bandwidth B, $[T_a-GrB, T_a]$ with best effort, $[T_b, T_b+GrA]$ with best effort.

In another embodiment, in response to the request message, the PCE computes a path for the LSP satisfying the network constraints and reserves a bandwidth 730 for the LSP in the time interval 720. In addition, the PCE makes sure that the path satisfies the network constraints which are relaxed such as the bandwidth at a lower priority in the graceful periods than that in the time interval 720 or a portion of the bandwidth 730 and reserves a downgraded bandwidth for the LSP in the graceful periods. Thus, a time schedule for the scheme 700 may be represented as shown below:

$[T_a, T_b]$ with bandwidth B, $[T_a-GrB, T_a]$ with a portion of bandwidth B, $[T_b, T_b+GrA]$ with a portion of bandwidth B.

The PCC may include the time schedule in the request message by indicating an absolute time for the time 712, an absolute time for the time 713, a relative time for the time 712, a relative time for the time 713, a duration of the interval 720, a duration of the first graceful period 771, a duration of the second graceful period 772, or combinations thereof, as described more fully below. It should be noted that although the scheme 700 illustrates scheduling mechanisms for bandwidth reservation, the scheme 700 may be employed for reserving other types of network resources, such as wavelengths, for LSPs. In addition, a PCC may schedule an LSP for carrying traffic by employing a combination of the schemes 500-700.

Figure 8:
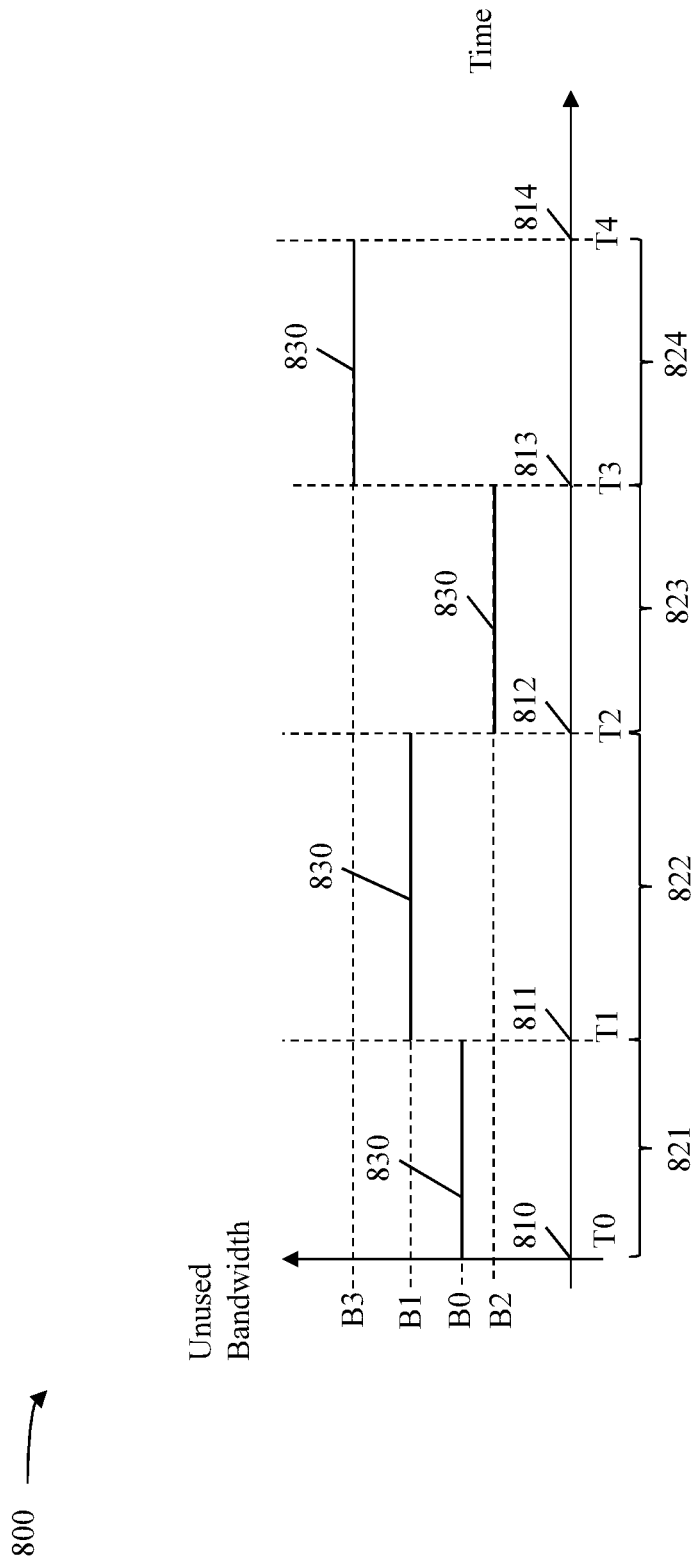
FIG. 8 is a timing diagram of an embodiment of a link bandwidth profile.

FIG. 8 is a timing diagram 800 illustrating an embodiment a link bandwidth profile 800. The profile 800 illustrates bandwidth availability of a link, such as the links 131 and 132, at a certain bandwidth priority. For example, a TEDB may maintain the amounts of unused bandwidth on a link for a particular bandwidth priority, such as one bandwidth priority for traffic at 10 gigabits per second (Gbps) and another bandwidth priority for traffic at 100 Gbps. The profile 800 may correspond to a time after a PCE, such as the PCEs 110, reserved bandwidths for one or more LSPs, such as the LSP 150, in one or more time intervals by employing the schemes 400, 500, 600, and 700. In FIG. 8, the x-axis represents time in some arbitrary units of time and the y-axis represents unused bandwidth in some arbitrary units of bandwidth. The profile 800 shows that the link comprises different amount of unused bandwidth 830 at different time intervals 821, 822, 823, and 824. For example, the amount of unused bandwidth 830 at the time interval 821 from a time 810, denoted as T0, to a time 811, denoted as T1, is B0. The amount of unused bandwidth 830 at the time interval 822 from the time 811 to a time 812, denoted as T2, is B1. The amount of unused bandwidth 830 at the time interval 823 from the time 812 to a time 813, denoted as T3, is B2. The amount of unused bandwidth 830 at the time interval 824 from the time 813 to a time 814, denoted as T4, is B3.

A TEDB may be employed for storing and tracking unused network resource, such as bandwidth, in a network domain, such as the network domain 140. In order to support a temporal network resource reservation scheme, such as the schemes 400, 500, 600, and 700, a TEDB may be extended to record unused network resources by time intervals, such as the time intervals 821-824. A TEDB that tracks network resources by time intervals are referred to as a time-based TEDB. In one embodiment, the TEDB may track time intervals by employing absolute time as shown below:

$$[T_j,B_j],[T_{j+1},B_{j+1}],[T_{j+2},B_{j+2}],\ldots,$$

where $T_j$ represents an absolute time, $B_j$ represents an amount of unused bandwidth in a time interval between $T_j$ and $T_{j+1}$, and j may vary from a value of 0 to any positive integer number depending on the number of time intervals tracked by the TEDB.

Thus, the profile 800 may be stored in the TEDB as shown below:

$$[T0,B0],[T1,B1],[T2,B2],[T3,B3].$$

It should be noted that the absolute time, $T_j$, is a global clock time synchronized among all network nodes, such as the network nodes 120, in the network.

In another embodiment, a TEDB may track time intervals by employing relative time as shown below:

$$[P_j,B_j],[P_{j+1},B_{j+1}],[P_{j+2},B_{j+2}],\ldots,$$

where $P_j=T_{j+1}-T_j$, j is a positive integer varying between a value of 0 and any positive integer depending on the number of time intervals tracked by the TEDB, $T_j$ represents a local time, and $B_j$ represents an amount of unreserved bandwidth in the time interval $P_j$.

Thus, the profile 800 may be stored in the TEDB as shown below:

$$[P0,B0],[P1,B1],[P2,B2],[P3,B3],$$

where P0=T1−T0, P1=T2−T1, P2=T3−T2, and P3=T4−T3.

Although absolute time may provide a higher accuracy than relative time, the employment of relative time enables network nodes, such as the network nodes 120, to operate according to their local clock time instead of synchronizing to a global clock time of the network. For example, a network node may track time intervals by configuring a timer to expire at every unit time and setting a counter to a duration of a first time interval (e.g., the time interval 821). At each timer expiration time, the counter may be decremented by one. Thus, the elapse of the time interval is detected when the counter reaches a value of zero. Upon the elapse of the time interval, the counter may be set to a duration of a next time interval (e.g., the time interval 822). It should be noted the representations of the time intervals and tracking of the time intervals may be alternatively configured by a person of skill in the art to achieve similar functionalities.

Figure 9:
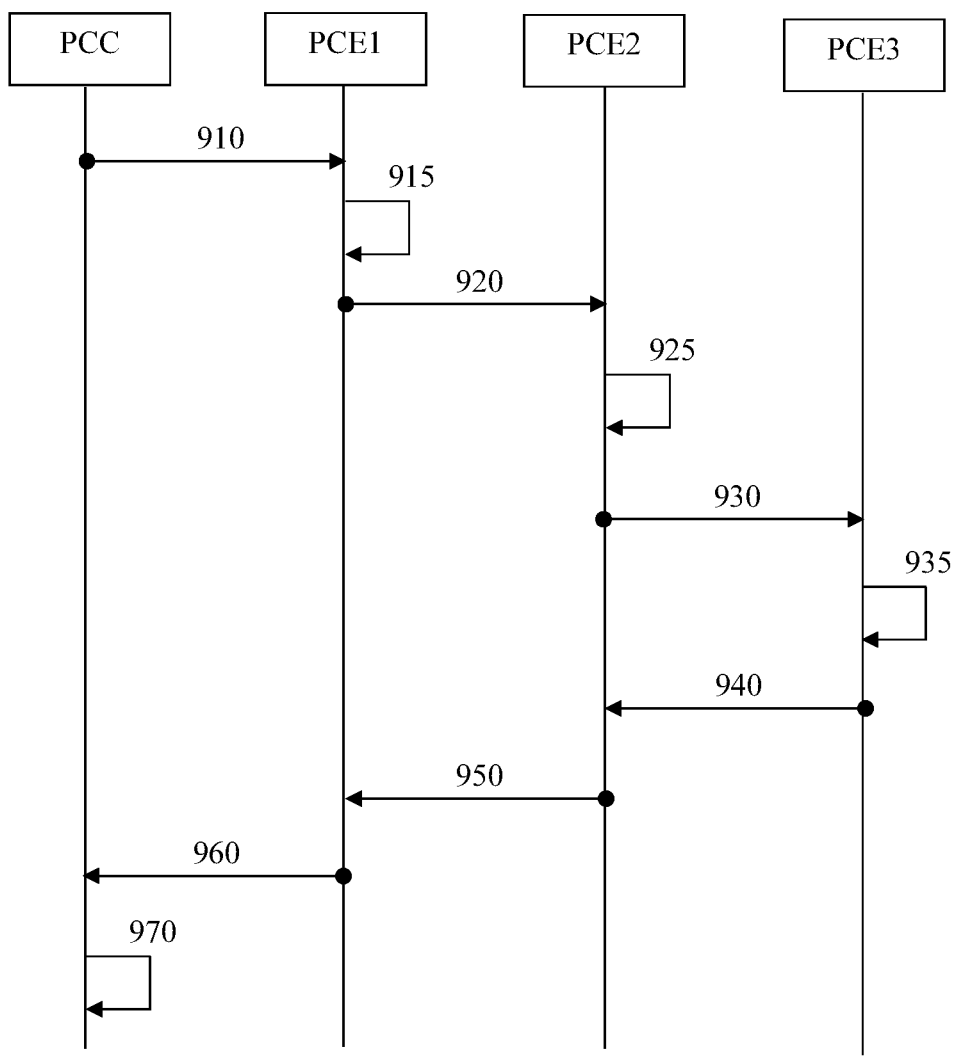
FIG. 9 is a protocol diagram of an embodiment of a temporal label switched path (LSP) path computation method that employs a forward search path computation (FSPC) scheme.

FIG. 9 is a protocol diagram of an embodiment of a temporal LSP computation method 900 that employs an FSPC scheme. The method 900 is implemented between a PCC of an ingress node, such as the source network node N1 120, a source domain PCE, denoted as PCE1, an intermediate transit domain PCE, denoted as PCE2, and a destination domain PCE, denoted as PCE3, where the intermediate transit domain interconnects the source domain and the destination domain. For example, PCE1, PCE2, and PCE3 may correspond to the PCE P1, P2, and P3 110, respectively. The method 900 is implemented when the PCC requests path computation for an LSP, such as the LSP 150 across multiple domains, such as the domains 140. When employing the FSPC scheme, path computation begins at a source domain. At step 910, the PCC sends a first PCReq message to PCE1 to request path computation for an end-to-end LSP from a source, such as the source network node N1 120, to a destination, such as the destination network node N7 120. The first PCReq message may indicate the source, the destination, a path computation constraint, such as a bandwidth constraint, and one or more time intervals when the LSP is scheduled for carrying data traffic. The time intervals may be similar to the time intervals 420, 520, 620, and 720 and may additionally include an elastic range, such as the elastic range lower bound 651 and the elastic range upper bound 652, and graceful periods, such as the graceful periods 771 and 772. At step 915, upon receiving the first PCReq message, PCE1 determines that the source is located in a domain operated by PCE1. Thus, PCE1 computes a shortest path from the source to each border network node, such as the network nodes 120, in the PCE1's domain satisfying the path computation constraint in the indicated time intervals. PCE1 uses the shortest path as a special link to build an SPT from the source and grows the SPT using links such links 131 connecting PCE1's domain to other domains and satisfying the path computation constraint in the time intervals. And then PCE1 selects a node in the SPT that is newly added into the SPT and is an entry border network node of another domain such as PCE2's domain.

At step 920, PCE1 sends a second PCReq message to PCE2 to request path computation for the LSP. The second PCReq message may be similar to the first PCReq message. At step 925, upon receiving the second PCReq message, PCE2 determines that the source is not within a domain operated by PCE2. Thus, PCE2 computes a shortest path from the entry border network node to each exit border network node of the PCE2's domain satisfying the path computation constraint in the indicated time intervals. PCE2 uses the shortest path as a special link to continue building the SPT and grows the SPT using links such links 131 connecting PCE2's domain to other domains and satisfying the path computation constraint in the time intervals. And then PCE2 selects a node in the SPT that is newly added into the SPT and is an entry border network node of another domain such as PCE3's domain.

At step 930, PCE2 sends a third PCReq message to PCE3 to request path computation for the LSP. The third PCReq message may be similar to the first PCReq message. At step 935, upon receiving the third PCReq message, PCE3 determines that the destination is in a domain operated by PCE3. Thus, PCE3 computes a shortest path from the entry border network node of the PCE3's domain to the destination and each exit border network node of the PCE3's domain satisfying the path computation constraint in the indicated time intervals. PCE3 uses the shortest path as a special link to continue building the SPT and grows the SPT using links such links 131 connecting PCE3's domain to other domains. And then PCE3 selects a node in the SPT that is newly added into the SPT and is an entry border network node of another domain. During the process of building and/or growing the SPT, once the destination is added into the SPT, the shortest path from the source to the destination is found. It is the path in the SPT from the source to the destination.

At step 940, PCE3 sends a first PCRep message to PCE2 in response to the third PCReq message indicating the shortest path from the source to the destination.

At step 950, upon receiving the first PCRep message, PCE2 sends a second PCRep message to PCE1 in response to the second PCReq message indicating the shortest path from the source to the destination.

At step 960, upon receiving the second PCRep message, PCE1 sends a third PCRep message to the PCC in response to the first PCReq message indicating the shortest path from the source to the destination.

At step 970, upon receiving the third PCRep message, the PCC and the PCE1, PCE2, and PCE3 may coordinate to reserve resources on each link, such as the links 131 and 132, along the path for the time intervals in advance. In one embodiment, the PCE1, PCE2 and PCE3 may reserve resources on each link, such as the links 131 and 132, along the shortest path for the time intervals in advance after the path is found. For example, the PCE3 reserves resources on each link in its domain along the path from its TEDB when it sends the first PCRep message to PCE2 containing the path; the PCE2 reserves resources on each link in its domain along the path from its TEDB when it sends the second PCRep message to PCE1 containing the path; and the PCE1 reserves resources on each link in its domain along the path from its TEDB when it sends the third PCRep message to PCC containing the path.

Figure 10:
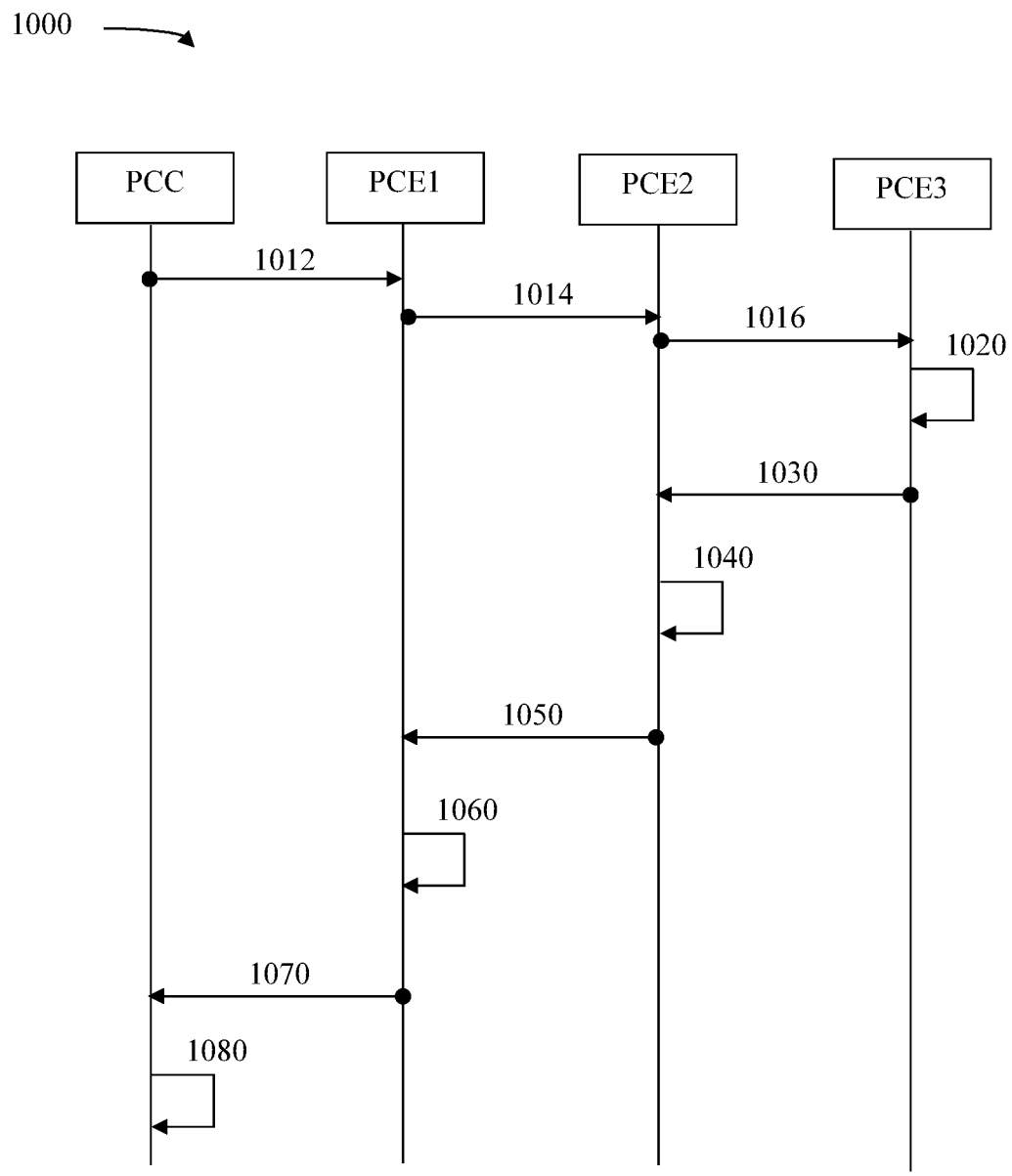
FIG. 10 is a protocol diagram of an embodiment of a temporal LSP path computation method that employs a backward recursive path computation (BRPC) scheme.

FIG. 10 is a protocol diagram of an embodiment of a temporal LSP computation method 1000 that employs a BRPC scheme. The method 1000 is implemented between a PCC of an ingress node, such as the source network node N1 120, a source domain PCE, denoted as PCE1, an intermediate transit domain PCE, denoted as PCE2, and a destination domain PCE, denoted as PCE3, where the intermediate transit domain interconnects the source domain and the destination domain. For example, PCE1, PCE2, and PCE3 may correspond to the PCE P1, P2, and P3 110, respectively. The method 1000 is implemented when the PCC requests path computation for an LSP across multiple domains, such as the domains 140. The method 1000 is similar to the method 900, but begins path computation at a destination domain. At step 1012, the PCC sends a first PCReq message to PCE1 to request path computation for an end-to-end LSP, such as the LSP 150, from a source, such as the source network node N1 120, to a destination, such as the destination network node N7 120. The PCReq message may indicate the source, the destination, the PCC, a path computation constraint, such as a bandwidth constraint, and one or more time intervals when the LSP may be employed for carrying data traffic. The time intervals may be similar to the time intervals 420, 520, 620, and 720 and may include an elastic range, such as the elastic range lower bound 651 and the elastic range upper bound 652, and graceful periods, such as the graceful periods 771 and 772. At step 1014, the PCE1 sends a second PCReq message to PCE2 to request path computation for the LSP after receiving the first PCReq message and determines that its domain does not contain the destination. The second PCReq message is similar to the first PCReq message. At step 1016, the PCE2 sends a third PCReq message to PCE3 to request path computation for the LSP after receiving the second PCReq message and determines that its domain does not contain the destination. The third PCReq message is similar to the second PCReq message. At step 1020, upon receiving the third PCReq message, PCE3 determines that the destination is in a domain operated by PCE3. Thus, PCE3 computes a shortest path from each entry border network node of the PCE3's domain to the destination satisfying the path computation constraint in the time intervals.

At step 1030, PCE 3 sends a first PCRep message to PCE2 to response the third PCReq message. The first PCRep message may include path computation information, such as the source, the destination, the PCC, the path computation constraint, and the time intervals, received in the PCReq message. The first PCRep message includes a SPT built from the destination using the shortest paths in the PCE3's domain as special links and using the links connecting PCE3's domain to PCE2's domain and satisfying the path computation constraint in the time intervals. At step 1040, upon receiving the first PCRep message, PCE2 determines that the source is not within a domain operated by PCE2. Thus, PCE2 computes a shortest path from each entry border network node to each exit border network node of the PCE2's domain satisfying the path computation constraint in the time intervals. PCE2 continues to build the SPT using the shortest paths in the PCE2's domain as special links and using the links connecting PCE2's domain to PCE1's domain and satisfying the path computation constraint in the time intervals.

At step 1050, PCE2 sends a second PCRep message to PCE1 to response the second PCReq message. The second PCRep message is similar to the first PCRep message, and includes the SPT comprising the shortest paths in the PCE2's domain. At step 1060, upon receiving the second PCRep message, PCE1 determines that the source is located in a domain operated by PCE1. Thus, PCE1 computes a shortest path from the source to each border network node of the PCE1's domain satisfying the path computation constraint in the time intervals. PCE1 continues to build the SPT until the source is added into the SPT.

At step 1070, PCE1 sends a third PCRep message to the PCC. The third PCRep message is similar to the second PCRep message, but additionally indicates the shortest paths from the source to the destination.

At step 1080, upon receiving the third PCRep message, the PCC and the PCE1, PCE2, and PCE3 may coordinate to reserve network resources on each link, such as the links 131 and 132, along the path for the time intervals in advance. For example, the PCE1 may reserve network resources such as bandwidth on each link along the path for the time intervals in its domain as required after computing the path from the source to the destination, and send a fourth PCReq message with the path and an indication for reserving network resources for the path to the PCE2. After receiving the fourth PCReq message, the PCE2 may reserves network resources such bandwidth on each link along the path for the time intervals in its domain, and send a fifth PCReq message with the path and an indication for reserving network resources for the path to the PCE3. After receiving the fifth PCReq message, the PCE3 may reserves network resources such bandwidth on each link along the path for the time intervals in its domain, and send a fourth PCRep message to the PCE2 in response to the fifth PCReq message and indicating the success of the network resources reservation in its domain for the path in the time intervals. After receiving the fourth PCRep message, the PCE2 may send a fifth PCRep message to the PCE1 in response to the fourth PCReq message and indicating the success of the network resources reservation in its domain for the path in the time intervals. After receiving the fifth PCRep message, the PCE1 may send a PCRep message to the PCC indicating that the network resources for the path in the time intervals are reserved in advance.

Figure 11:
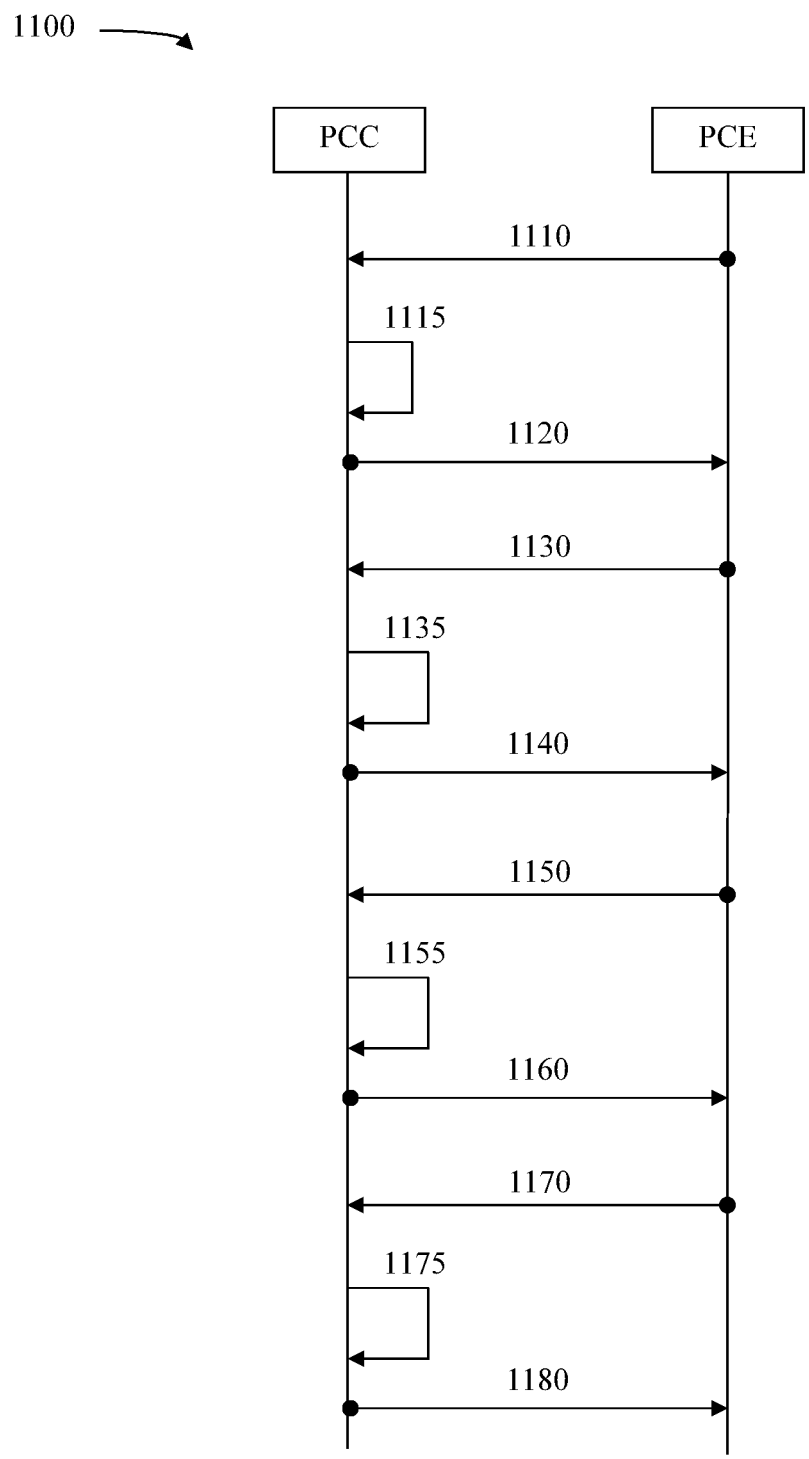
FIG. 11 is a protocol diagram of an embodiment of a temporal LSP creation and deletion method.

FIG. 11 is a protocol diagram of an embodiment of a temporal LSP creation and deletion method 1100. The method 1100 is implemented between a PCC of an ingress, such as the source network node N1 120, and a PCE, such as the PCEs 110. The method 1100 is implemented after the PCE computed a path and reserved a network resource for an LSP, such as the LSP 150, in a series of time intervals, such as the recurrent time interval 520 shown in the scheme 500, by employing similar mechanisms as described in the methods 900 and 1000. As an example, the recurrent time interval includes a first time interval between time Ta and Tb and a second time interval between time Ta+C and Tb+C, where C represents a duration of the recurrence period. In the method 1100, the PCE requests the PCC to create and delete the LSP in each time interval. At step 1110, at the beginning of the first time interval (e.g., time Ta), the PCE sends a PCInitiate message to the PCC to initiate creation of the LSP. The first PCInitiate message may include various parameters associated with the creation of the LSP. For example, the parameters may include timing information associated with the recurrent time interval, as discussed more fully below. At step 1115, upon receiving the first PCInitiate message, the PCC creates the LSP, for example, by employing the RSVP-TE protocol. At step 1120, the PCC sends a first PCRpt message to the PCE in response to the first PCInitiate message indicating the completion of the LSP creation.

At step 1130, at the end of the first time interval (e.g., time Tb), the PCE sends a second PCInitiate to the PCC to initiate deletion of the LSP. At step 1135, upon receiving the second PCInitiate message, the PCC deletes the LSP. At step 1140, the PCC sends a second PCRpt message to the PCE in response to the second PCInitiate message indicating the completion of the LSP deletion.

At step 1150, at the beginning of the second time interval (e.g., time Ta+C), the PCE sends a third PCInitiate message to the PCC to initiate creation of the LSP. The third PCInitiate message is similar to the first PCInitiate message. At step 1155, upon receiving the third PCInitiate message, the PCC creates the LSP according to the third PCInitiate message. At step 1160, the PCC sends a third PCRpt message to the PCE in response to the third PCInitiate message indicating the completion of the LSP creation.

At step 1170, at the end of the second time interval (e.g., time Tb+C), the PCE sends a fourth PCInitiate to the PCC to request deletion of the LSP. At step 1175, upon receiving the fourth PCInitiate message, the PCC deletes the LSP. At step 1180, the PCC sends a fourth PCRpt message to the PCE in response to the fourth PCInitiate message indicating the completion of the LSP deletion. It should be noted that in the method 1100, the set ups and the tear downs of the LSP in each of the time intervals are initiated by the PCE and the PCC may or may not track the intervals.

Figure 12:
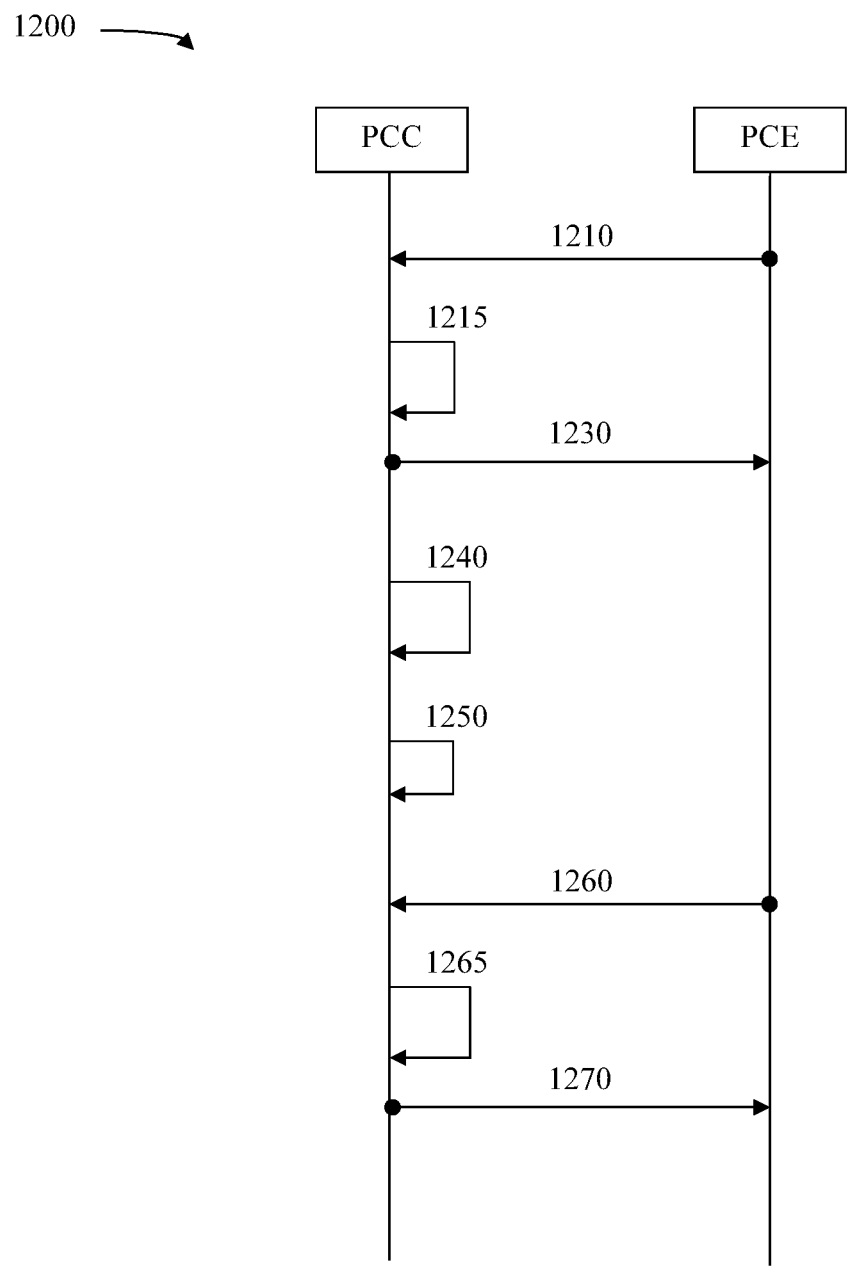
FIG. 12 is a protocol diagram of another embodiment of a temporal LSP creation and deletion method.

FIG. 12 is a protocol diagram of another embodiment of a temporal LSP creation and deletion method 1200. The method 1200 is implemented between a PCC of an ingress, such as the source network node N1 120, and a PCE, such as the PCEs 110. The method 1200 is implemented after the PCE computed a path and reserved a network resource for an LSP, such as the LSP 150, according to a schedule that comprises a series of time intervals, such as the recurrent time interval 520 in the scheme 500 by employing similar mechanisms as described in the methods 900 and 1000. The method 1200 is similar to the method 1100, but the LSP is created once at the beginning of a first time interval in the LSP schedule and deleted once at the end of a last time interval in the time schedule. As an example, the LSP schedule includes a first time interval between time Ta and Tb and a second time interval between time Ta+C and Tb+C, where C represents a duration of the recurrence interval. In the method 1200, the PCE requests the PCC to create an LSP at the beginning of a first time interval, for example, at time Ta, and to delete the LSP at the end of a last time interval, for example, at time Tb+C. At step 1210, at the beginning of the first time interval (e.g., time Ta), the PCE sends a first PCInitiate message to the PCC to request creation of the LSP. The first PCInitiate message includes various parameters associated with the creation of the LSP. The parameters may include timing information associated with the recurrent time interval, as discussed more fully below. At step 1215, upon receiving the first PCInitiate message, the PCC creates the LSP, for example, by employing the RSVP-TE protocol. After creating the LSP, the PCC sets an LSP flag to active indicating that the LSP is scheduled for carrying traffic. At step 1230, the PCC sends a PCRpt message to the PCE in response to the first PCInitiate message indicating the completion of the LSP creation.

At step 1240, at the end of the first time interval (e.g., time Tb), the PCC sets the LSP flag to inactive indicating that the LSP is not scheduled for carrying traffic. At step 1250, at the beginning of the second time interval (e.g., time Ta+C), the PCC sets the LSP flag to active indicating that the LSP is schedule for carrying traffic.

At step 1260, at the end of the last time interval (e.g., time Tb+C), the PCE sends a second PCInitiate to the PCC to request deletion of the LSP. At step 1265, upon receiving the second PCInitiate message, the PCC deletes the LSP. At step 1270, the PCC sends a second PCRpt message to the PCE in response to the second PCInitiate message indicating the completion of the LSP deletion. As shown, the LSP is created once at the beginning of the LSP schedule and deleted once at the end of the LSP schedule and the PCC tracks the state (e.g., active or inactive) of the LSP according to the LSP schedule given by the PCE in the first PCInitiate message. It should be noted that the LSP state tracking mechanisms at the PCC may be alternatively configured as determined by a person of ordinary skill in the art to achieve similar functionalities.

Figure 13:
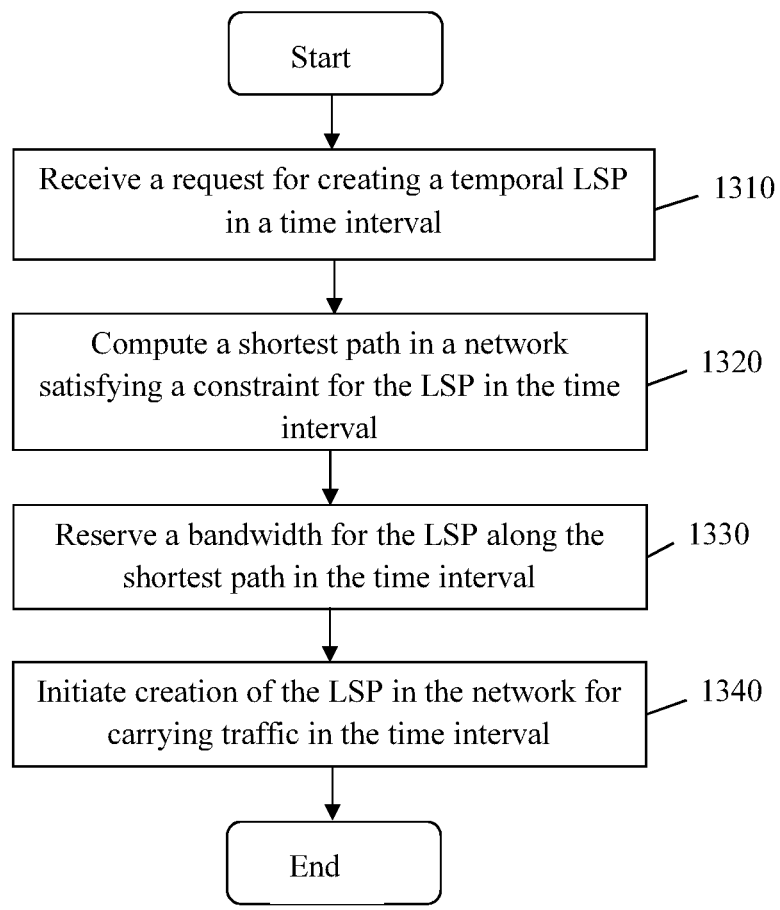
FIG. 13 is a flowchart of an embodiment of a temporal LSP creation method.

FIG. 13 is a flowchart of an embodiment of a temporal LSP creation method 1300. The method 1300 is implemented by a PCE, such as the PCEs 110, and the NE 300. The method 1300 is implemented when creating a temporal LSP, such as the LSP 150. The method 1300 employs similar mechanisms as described in the methods 900, 1000, 1100, and 1200. At step 1310, a request for creating a temporal LSP in a time interval is received, for example, from a PCC of an ingress, such as the source network node N1 120. The temporal LSP may be a P2P LSP or a P2MP LSP. The request may indicate a start time, such as the start time 411, 511, 612, and 712, and an end time, such as the end time 412, 512, 614, and 713, for the time interval. The start time and/or the end time may be represented as absolute times and/or relative times. In addition, the request may indicate a repeat cycle for the time interval, a number of repeats for the time interval, one or more graceful periods, such as the graceful periods 771 and 772, and/or an elastic range with an elastic range lower bound, such as the elastic range lower bound 651, and an elastic range upper bound, such as the elastic range upper bound 652. When the request includes a repeat cycle and a number of repeats for the time interval, the time interval is a recurrent time interval, which may be similar to the time interval 520 in the scheme 500.

At step 1320, a shortest path in a network, such as the network 100, satisfying a constraint is computed, for example, by employing a CSPF algorithm. The constraint may include bandwidth, wavelengths, delays, QoS, and number of hops. For example, the PCE is configured to compute paths in a single AS domain, such as the domains 140. Thus, the computed shortest path may span a segment of the LSP within the AS domain of the PCE. When the time interval is a recurrent time interval, the shortest path is computed such that the shortest path satisfies the constraint in each recurring time interval.

At step 1330, a bandwidth is reserved for the LSP along the shortest path in the time interval. The bandwidth is reserved from a TEDB on each of the links along the shortest path computed for the LSP. When the time interval is a recurrent time interval, the bandwidth is reserved for the LSP along the shortest path in each recurring time interval. In addition, information associated with the LSP is stored in an LSP database (LSPDB). For example, the information may include a Global LSP identifier (GLSP-ID) that identifies the LSP in the network globally, the computed path, the time interval and the status of the LSP. In one embodiment, the GLSP-ID of a P2P LSP may be a PCEP message object, which comprises the source address and the destination address of the LSP, a number that is unique for the LSP tunnel within the source domain and another number that is unique for an LSP within the tunnel.

At step 1340, creation of the LSP in the network for carrying traffic is initiated, for example, by sending a PCInitiate message to the PCC. When the time interval is a recurrent time interval, the PCE may employ the method 1200 or 1300 to initiate creation and deletion of the recurring time intervals.

It should be noted that after a temporal LSP is created, a user or an application may request to increase a duration of a scheduled time interval, to decrease a duration of a scheduled time interval, to add a new time interval, or to delete a scheduled time interval. To increase a duration of a scheduled time interval, a PCE, such as the PCEs 110, may compute a path for the increased time interval satisfying a constraint of the LSP and extend the reservation of network resources on each link along the LSP according to the increased time interval. In one embodiment, a PCE may compute a path for the time duration that is increased from the scheduled time interval along the path computed for the LSP in the scheduled time interval and reserve network resources on each link along the LSP in the duration increased. In another embodiment, a PCE may compute a path for the increased time interval including the scheduled time interval and the duration increased by sharing the network resources reserved for the LSP in the scheduled time interval, release the network resources for the LSP in the scheduled time interval and reserve network resources in the increased time interval. To decrease a duration of a schedule time interval, a PCE may release previously reserved network resources on each link along the LSP in the time duration that is removed. To add a new time interval, a PCE may compute a path for the new time interval satisfying a constraint of the LSP and reserve network resources on each link along the LSP according to the new time interval. To delete a scheduled time interval, a PCE may release previously reserved network resources on each link along the LSP in the deleted time interval.

Figure 14:
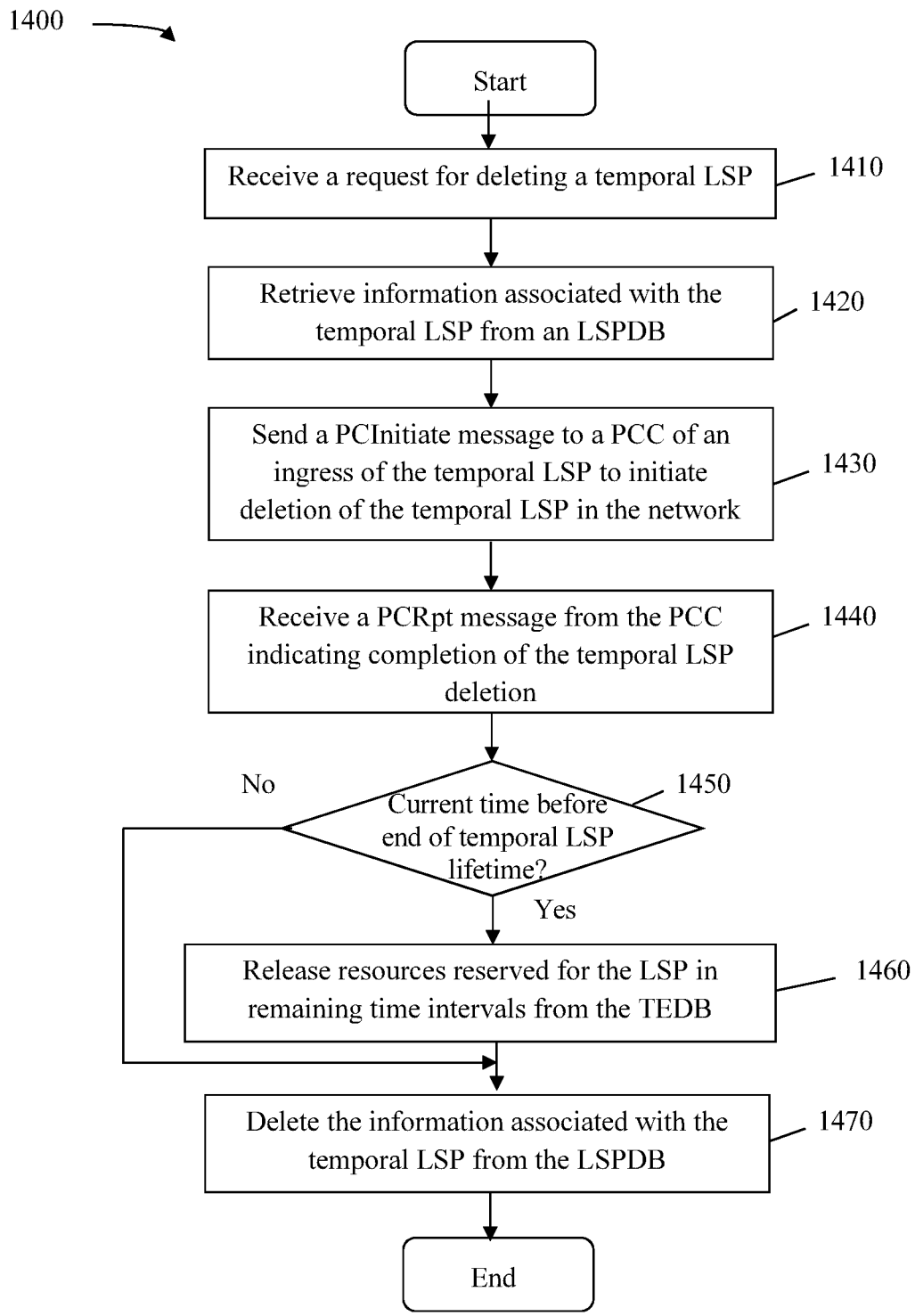
FIG. 14 is a flowchart of an embodiment of a temporal LSP deletion method.

FIG. 14 is a flowchart of an embodiment of a temporal LSP deletion method 1400. The method 1400 is implemented by a PCE, such as the PCEs 110, and the NE 300. The method 1400 is implemented when deleting a temporal LSP, such as the LSP 150, from a network, such as the network 100. For example, the PCE has computed a path and reserved a network resource for temporal LSP in a series of time intervals similar to the time intervals 520 in the scheme 500 by employing similar mechanisms as described in the methods 900, 1000, 1100, 1200, and 1300. At step 1410, a request for deleting the LSP is received, for example, from a user or an application. The temporal LSP may be a P2P LSP or a P2MP LSP. For example, the request may include a global LSP ID of the temporal LSP. At step 1420, information associated with the temporal LSP is retrieved from an LSP DB. For example, the temporal LSP information may include path information, time intervals scheduled for the LSP, and the network resource reserved for the temporal LSP in the time intervals. At step 1430, a PCInitiate message is sent to a PCC of an ingress of the temporal LSP, such as the source network node N1 120, to initiate deletion of the temporal LSP in the network. At step 1440, a PCRpt message is received from the PCC indicating completion of the temporal LSP deletion.

At step 1450, a determination is made whether a current time is before the lifetime of the temporal LSP. The lifetime of the temporal LSP spans a time period from the beginning of a first time interval to the end of a last time interval in the series. If the LSP is deleted before the end of the lifetime of the temporal LSP, next at step 1460, network resources that are reserved for the temporal LSP in all remaining time intervals are released. Otherwise, the method 1400 proceeds to step 1470. At step 1470, the information associated with the temporal LSP is deleted from the LSPDB. It should be noted in some embodiments, a PCE may also initiate LSP deletion, for example, at the end of a recurring time interval as described in the method 1300. In such an embodiment, the PCE may skip the steps 1410 and 1460.

In an embodiment, the PCEP, the OSPF protocol extensions, the IS-IS protocol extensions are extended to support initiation and maintenance of temporal LSPs as described in the methods 900, 1000, 1100, 1200, 1300, and 1400. For example, a PCEP PCReq message may be extended to include timing information of an LSP, such as the LSP 150, as shown below:

```
<PCReq Message>::= <Common Header>
                   [<svec-list>]
                   <request-list>
<request-list>::=<request>[<request-list>]
<request>::= <RP> <END-POINTS> [<OF>] [<LSPA>]
             [<BANDWIDTH>] [<metric-list>] [<RRO>
             [<BANDWIDTH>]] [<IRO>] [<LOAD-BALANCING>]
             [<TIME-INTERVAL>][<GLSP-ID>]
```

In the PCReq message shown above, the request parameter object, <RP>, the endpoint object, <END-POINTS>, the LSP attribute object, <LSPA>, the requested bandwidth object, <BANDWIDTH>, the metric object list, <metric-list>, the recorded route object, <RRO>, and the load balancing object, <LOAD-BALANCING> are as described in the PCEP. The time-interval object, <TIME-INTERVAL> is a message object for indicating an LSP schedule. The content and format of the time-interval object is described more fully below. The global LSP ID object, <GLSP-ID> is a message object for uniquely identifying an LSP globally.

Similarly, a PCEP PCRep message may be extended to include a time-interval object, <TIME-INTERVAL>, as shown below:

```
<PCRep Message>::= <Common Header>
                   <response-list>
<response-list>::=<response>[<response-list>]
<response>::= <RP> [<NO-PATH>] [<attribute-list>] [<path-list>]
<path-list>::=<path>[<path-list>]
<path>::= <ERO><attribute-list> [<TIME-INTERVAL>][<GLSP-ID>]
```

In additions, a PCEP PCInitiate message and a PCEP PCRpt message may be extended to include a time-interval object, <TIME-INTERVAL>>, and a global LSP ID object, <GLSP-ID>, in addition to a stateful request parameters (SRP) object, an LSP object, and an explicit route object (ERO) as described in the PCEP.

Figure 15:
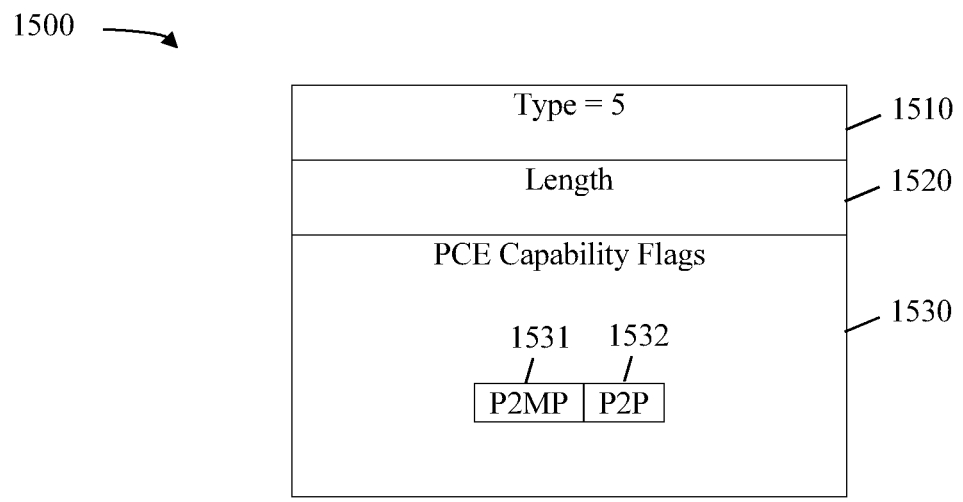
FIG. 15 is a schematic diagram illustrating an embodiment of a PCE capability flags (PCE-CAP-FLAGS) subtype-length-value (TLV).

FIGS. 15-29 illustrate various embodiments for extending the PCEP, the OSPF protocol, and the IS-IS protocol to facilitate initiation, creation, and deletion of temporal LSPs. FIG. 15 is a schematic diagram illustrating an embodiment of a PCE capability flags (PCE-CAP-FLAGS) sub-TLV 1500. The sub-TLV 1500 is employed by an OSPF to advertise the PCE's path computation capabilities in order to facilitate temporal LSP initiation and maintenance. For example, an OSPF may send an OSPF Router Information Link State Advertisement (LSA) comprising an OSPF PCE Discovery TLV (PCED TLV) with the sub-TLV 1500 during PCE discovery. The sub-TLV 1500 comprises a type field 1510, a length field 1520, and a PCE Capability flags field 1530. The type field 1510 is about two octets long and is set to a value of five to indicate that the sub-TLV 1500 is a PCE-CAP-FLAGS sub-TLV. The length field 1520 is about two octets long and indicates a length of the PCE capability flags field 1530. For example, the length field 1520 may indicate the length of the PCE capability flags 1530 in a multiple of about four octets. The PCE Capability flags field 1530 comprises a P2MP Temporal LSP flag 1531 and a P2P Temporal LSP flag 1532. The P2MP flag 1531 is about one bit long and indicates whether the PCE support path computation for a temporal P2MP LSP in a given time interval. The P2P flag 1532 is about one bit long and indicates whether the PCE support path computation for a temporal P2P LSP in a given time interval. The PCE Capability flags field 1530 may comprise other flags as described in RFC 5088.

Figure 16:
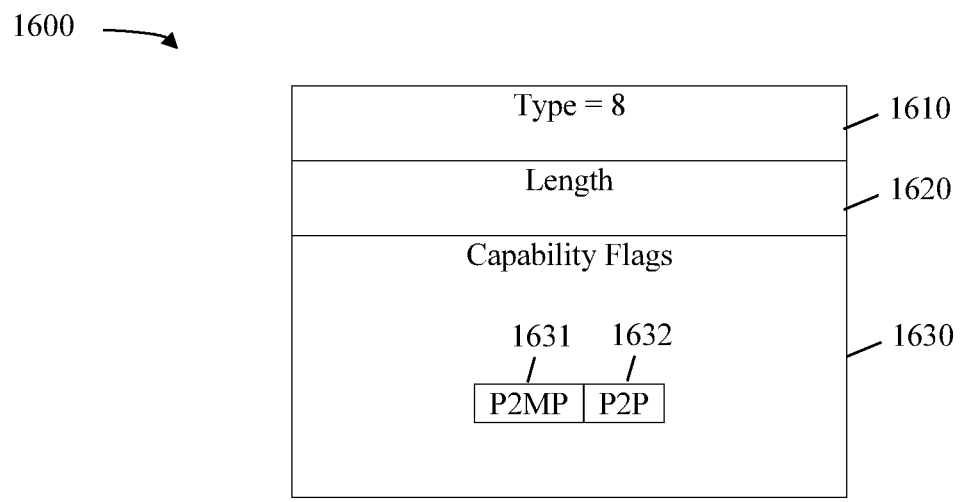
FIG. 16 is a schematic diagram illustrating an embodiment of an open message extension TLV.

FIG. 16 is a schematic diagram illustrating an embodiment of an open message extension TLV 1600. The TLV 1600 is employed by a PCE, such as the PCEs 110 in a domain, such as the domains 140 in the network 100, to exchange path computation capability information with other PCEs. For example, the PCE may send a PCEP open message comprising the TLV 1600 to another PCE during a PCEP session establishment, where the PCEP open message may be as described in the RFC 5440. The TLV 1600 comprises a type field 1610, a length field 1620, and a Capability flags field 1630. The type field 1610 is about two octets long and is set to a value of eight to indicate that the TLV 1600 is an open message extension TLV. The length field 1620 is about two octets long and indicates a length of the capability flags field 1630. The Capability flags field 1630 comprises a P2MP flag 1631 and a P2P flag 1632. The P2MP flag 1631 is about one bit long and indicates whether the PCE support path computation for a temporal P2MP LSP in a given time interval. The P2P flag 1632 is about one bit long and indicates whether the PCE support path computation for a temporal P2P LSP in a given time interval. The Capability flags field 1630 may comprise other flags as described in the PCEP.

Figure 17:
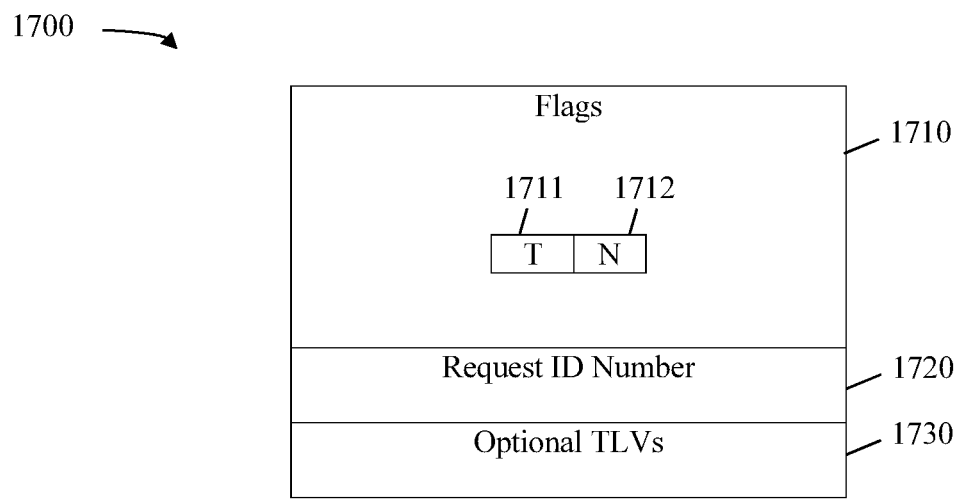
FIG. 17 is a schematic diagram illustrating an embodiment of a request parameter (RP) object.

FIG. 17 is a schematic diagram illustrating an embodiment of an RP object 1700. The RP object 1700 is employed by a PCE, such as the PCEs 110, in a domain, such as the domains 140 in the network 100, and a PCC of an ingress, such as the source network node 120 in the network 100. For example, the RP object 1700 may be included in a PCReq message and a PCRep message during LSP path computation as described in the method, where the PCReq and the PCRep message may be as described in the RFC 5440. The RP object 1700 is employed to indicate parameters related to a path computation request. The RP object 1700 includes a Flags field 1710, a Request ID Number field 1720, and one or more optional TLVs 1730. The Flags field 1710 is about four octets long. The Flags field 1710 comprises a T flag 1711 and an N flag 1712. The T flag 1711 is about one bit long. For example, the T flag 1711 may be set to a value of zero to indicate that a request is not for a path computation for a particular time interval. The T flag 1711 may be set to a value of one to indicate that a request is for a path computation for a particular time interval. The N flag 1712 is about one bit long. For example, the N flag 1712 may be set to a value of zero to indicate that a request is for a P2P LSP. The N flag 1712 may be set to a value of one to indicate that a request is for a P2MP LSP. The Flags field 1710 may comprise other flags as described in the PCEP. The Request ID number field 1720 is about four octets long and indicates an identifier for the request. The Optional TLV 1730 is variable in length and may include TLVs related to the request.

Figure 18:
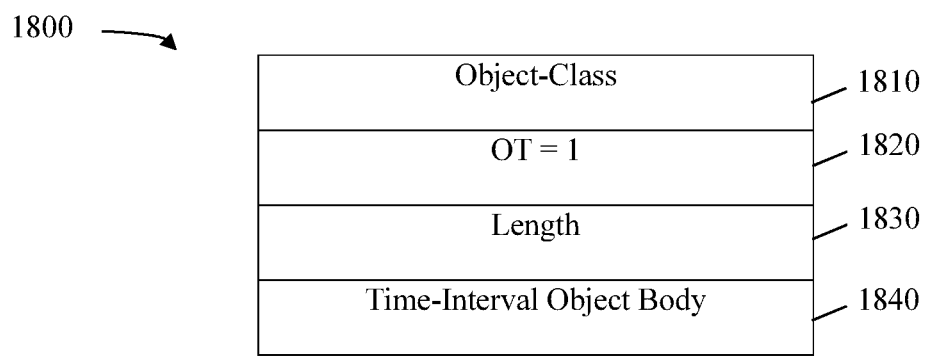
FIG. 18 is a schematic diagram illustrating an embodiment of a time-interval object.

FIG. 18 is a schematic diagram illustrating an embodiment of a time-interval object 1800. The time-interval object 1800 is employed by a PCE, such as the PCEs 110, in a domain, such as the domains 140 in the network 100, and a PCC of an ingress, such as the source network node 120 in the network 100, to indicate time intervals, such as the time intervals 420, 520, 620, and 720 in the schemes 400, 500, 600, and 700, that an LSP may carry traffic. For example, the time-interval object 1800 may be included in a PCReq message, a PCRep message, a PCInitiate message, and a PCRpt message. The PCInitiate and PCRpt messages may be as described in IETF document draft-ietf-pce-pce-initiated-lsp-04. The time-interval object 1800 is similar to a PCEP object as described in the PCEP. The time-interval object 1800 comprises an Object-Class field 1810, an object type (OT) field 1820, a length field 1830, and a Time-Interval Object Body field 1840. The Object-Class field 1810 is about one octet long and indicates a time-interval object-class. For example, the Object-Class field 1810 may be set to a value of 18 to indicate that the time-interval object 1800 is a time interval object. The Object-Type field 1820 is about one octet long and indicates a time-interval object-type. The length field 1830 is about two octets long and indicates the length of the Time-Interval Object Body field 1840. The Time-Interval Object Body field 1840 is variable in length and may comprise one or more TLVs associated with one or more time intervals employed for path computation.

Figure 19:
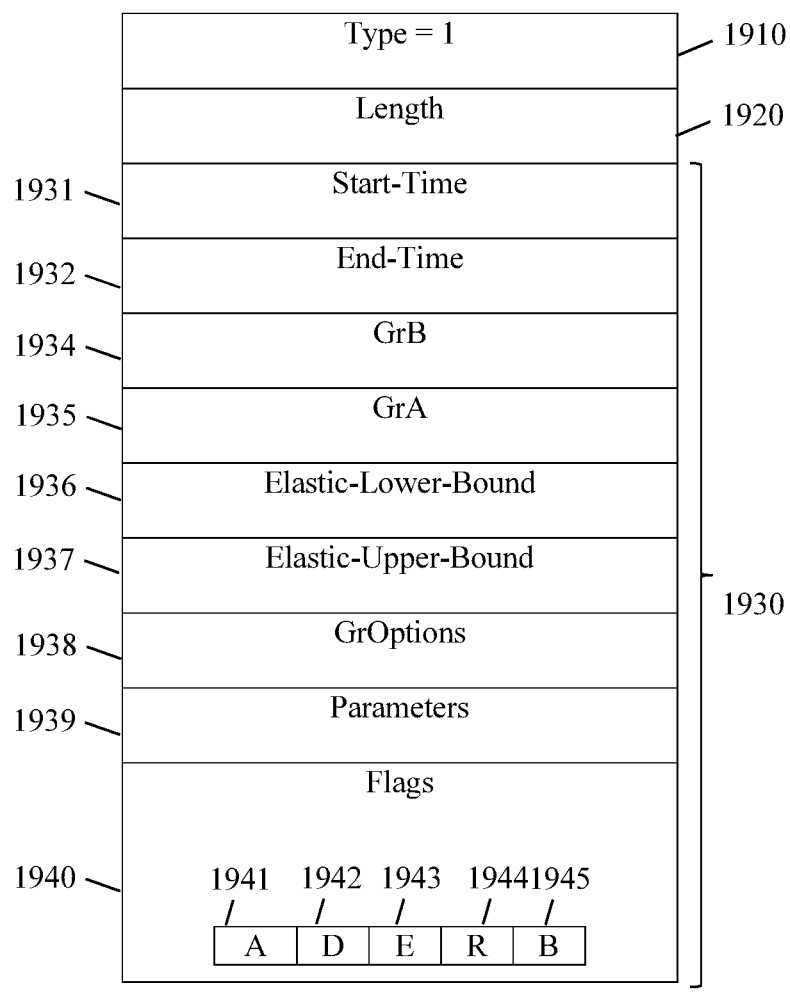
FIG. 19 is a schematic diagram illustrating an embodiment of an absolute time interval TLV.

FIG. 19 is a schematic diagram illustrating an embodiment of an absolute time interval TLV 1900. The TLV 1900 is employed by a PCE, such as the PCEs 110 in a domain, such as the domains 140 in the network 100, and a PCC of an ingress, such as the source network node 120 in the network 100, to indicate a time interval, such as the time intervals 420, 620, and 720 in the schemes 400, 600, and 700, that an LSP may carry traffic. The TLV 1900 may be included in a time-interval object 1800 of a PCReq message, a PCRep message, a PCInitiate message, and a PCRpt message. The TLV 1900 comprises a type field 1910, a length field 1920, and a TLV body 1930. The type field 1910 is about two octets long and is set to a value of one to indicate that the TLV 1900 is an absolute time interval TLV. The length field 1920 is about two octets long and indicates a length of the TLV body 1930. The TLV body 1930 comprises a Start-Time field 1931, an End-Time field 1932, a GrB field 1934, a GrA field 1935, an Elastic-Lower-Bound field 1936, an Elastic-Upper-Bound field 1937, a GrOptions field 1938, a Parameter field 1939 and a Flags field 1940.

The Start-Time field 1931 is about four octets long and indicates an absolute time when an LSP starts to carry traffic. The End-Time field 1932 is about four octets long and indicates an absolute time when the LSP stops carrying traffic. For example, the time duration between the Start-Time field 1931 and the End-Time field 1932 represents a time interval that the LSP may carry traffic.

The GrB field 1934 is about two octets long and indicates a time duration in seconds for a graceful period, such as the graceful period 771, prior to the absolute time indicated in the Start-Time field 1931. The GrA field 1935 is about two octets long and indicates a time duration in seconds in a graceful period, such as the graceful period 772, after the absolute time indicated in the End-Time field 1932.

The Elastic-Lower-Bound field 1936 is about two octets long and indicates a maximum amount of time in seconds prior to the absolute time indicated in the Start-Time field 1931 that a time interval may be scheduled for the LSP. The Elastic-Upper-Bound field 1937 is about two octets long and indicates a maximum amount of time in seconds after the absolute time indicated in the End-Time field 1932 that a time interval for the LSP may be scheduled to completion. For example, the Elastic-Lower-Bound field 1936 and the Elastic-Upper-Bound field 1937 may correspond to the elastic range lower bound 651 and the elastic range upper bound 652 in the scheme 600. It should be noted that the GrB field 1934, the GrA field 1935, Elastic-Lower-Bound field 1936, and/or the Elastic-Upper-Bound field 1937 may be set to values of zero indicating that the graceful periods and/or the elastic range scheduling mechanisms do not applied to the LSP.

The GrOptions field 1938 is about 3 bits long and indicates an action on graceful periods. It may have a value of zero, one or two. The value of zero indicates that the LSP carries the traffic during the graceful periods in best efforts. The value of one indicates that a portion of network resources such as bandwidth is to be allocated and reserved for the LSP during the graceful periods. In this case, the Parameters field 1939 indicates the portion in a number of percentages. The value of two in the GrOptions field indicates that the LSP carries the traffic during the graceful periods in a lower priority. In this case, the Parameters field 1939 indicates the number of priorities below the priority that is used for the LSP during the time interval from Start-time to End-time. The Parameters field is about 7 bits long and indicates a percentage of network resources or a number of priorities accordingly.

The Flags field 1940 is about 22 bits long and comprises a flag A 1941, a flag D 1942, a flag E 1943, a flag R 1944, and a flag B 1945. The rest of bit fields in the Flags field 1940 are set to zero. The flag A 1941 is about one bit long and indicates that the time interval from Start-time to End-time is to be added for the LSP when it is set to one. The flag D 1942 is about one bit long and indicates that the time interval from Start-time to End-time is to be deleted for the LSP when it is set to one. The flag E 1943 is about one bit long and indicates that the time interval from Start-time to End-time is an extended time interval from an existing time interval for the LSP when it is set to one. The flag R 1944 is about one bit long and indicates that the time interval from Start-time to End-time is a reduced time interval from an existing time interval for the LSP when it is set to one. The flag B 1945 is about one bit long and indicates that the network resources such as bandwidth is to be booked on each link along the path for the LSP in the time interval from Start-time to End-time when it is set to one.

After receiving a first PCReq message containing a time-interval object with a time interval TLV indicating a first time interval and a path for the LSP for some existing time intervals, a PCE may check if the path satisfies the constraints for the LSP in the first time interval in its domain when the flag A is set to one. If so, the PCE sends a second PCReq message along the path to a next PCE. The second PCReq message is similar to the first PCReq message. When a PCE responding for a domain containing the destination of the LSP receives the second PCReq message, it may check if the path satisfies the constraints for the LSP in the first time interval in its domain when the flag A is set to one. If the path in its domain satisfies the constraints in the first time interval, it reserves the network resources such as bandwidth for the LSP on each link in its domain along the path in the first time interval when the flag B is set to one and sends a first PCRep message in response to the second PCReq message. After the PCE sending the second PCReq message receives the first PCRep message, it reserves the network resources such as bandwidth for the LSP on each link in its domain along the path in the first time interval when the flag B is set to one and sends a second PCRep message in response to the first PCReq message. When the first PCReq is from a PCC, the PCC receives the second PCRep message and the network resources have been reserved for the LSP along the path in the first time interval if the flag B is set to one.

After receiving a first PCReq message containing a time-interval object with a time interval TLV indicating a first time interval and a path for the LSP for some existing time intervals, a PCE may determine if the first time interval is an existing time interval for the LSP in its LSP DB when the flag D is set to one. If the first time interval is an existing time interval for the LSP, the PCE releases the network resources such as bandwidth reserved on each link in its domain along the path for the LSP in the first time interval, removes the first time interval for the LSP from its LSP DB, and sends a second PCReq message along the path to a next PCE. The second PCReq message is similar to the first PCReq message. When a PCE responding for a domain containing the destination of the LSP receives the second PCReq message, it may determine if the first time interval is an existing time interval for the LSP in its LSP DB when the flag D is set to one. If the first time interval is an existing time interval for the LSP, the PCE releases the network resources such as bandwidth reserved on each link in its domain along the path for the LSP in the first time interval, removes the first time interval for the LSP from its LSP DB, and sends a first PCRep message in response to the second PCReq message. After the PCE sending the second PCReq message receives the first PCRep message, it sends a second PCRep message in response to the first PCReq message. When the first PCReq is from a PCC, the PCC receives the second PCRep message, the network resources reserved have been released for the LSP along the path in the first time interval and the first time interval for the LSP is deleted.

After receiving a first PCReq message containing a time-interval object with a time interval TLV indicating a first time interval and a path for the LSP for some existing time intervals, a PCE may determine if the first time interval is an extended time interval from an existing time interval for the LSP in its LSP DB and check if the path satisfies the constraints for the LSP in a second time interval that contains time in the first time interval but not in the existing time interval in its domain when the flag E is set to one. If so, the PCE sends a second PCReq message along the path to a next PCE. The second PCReq message is similar to the first PCReq message. When a PCE responding for a domain containing the destination of the LSP receives the second PCReq message, it may determine if the first time interval is an extended time interval from an existing time interval for the LSP in its LSP DB and check if the path satisfies the constraints for the LSP in the second time interval in its domain when the flag E is set to one. If the first time interval is an extended time interval from an existing time interval for the LSP and the path in its domain satisfies the constraints in the second time interval, it reserves the network resources such as bandwidth for the LSP on each link in its domain along the path in the second time interval (thus the network resources is reserved for the LSP in first time interval) when the flag B is set to one and sends a first PCRep message in response to the second PCReq message. After the PCE sending the second PCReq message receives the first PCRep message, it reserves the network resources such as bandwidth for the LSP on each link in its domain along the path in the second time interval when the flag B is set to one and sends a second PCRep message in response to the first PCReq message. When the first PCReq is from a PCC, the PCC receives the second PCRep message and the network resources have been reserved for the LSP along the path in the first time interval when the flag B is set to one.

After receiving a first PCReq message containing a time-interval object with a time interval TLV indicating a first time interval and a path for the LSP for some existing time intervals, a PCE may determine if the first time interval is a reduced time interval from an existing time interval for the LSP in its LSP DB when the flag R is set to one. If the first time interval is a reduced time interval from an existing time interval for the LSP, the PCE releases the network resources such as bandwidth reserved on each link in its domain along the path for the LSP in a second time interval that is in the existing time interval and out of the first time interval, replaces the existing time interval with the first time interval for the LSP in its LSP DB, and sends a second PCReq message along the path to a next PCE. The second PCReq message is similar to the first PCReq message. When a PCE responding for a domain containing the destination of the LSP receives the second PCReq message, it may determine if the first time interval is a reduced time interval from an existing time interval for the LSP in its LSP DB when the flag R is set to one. If the first time interval is a reduced time interval from an existing time interval for the LSP, the PCE releases the network resources such as bandwidth reserved on each link in its domain along the path for the LSP in the second time interval, replaces the existing time interval with the first time interval for the LSP in its LSP DB, and sends a first PCRep message in response to the second PCReq message. After the PCE sending the second PCReq message receives the first PCRep message, it sends a second PCRep message in response to the first PCReq message. When the first PCReq is from a PCC, the PCC receives the second PCRep message, the network resources reserved have been released for the LSP along the path in the second time interval and the existing time interval for the LSP is reduced to the first time interval.

Figure 20:
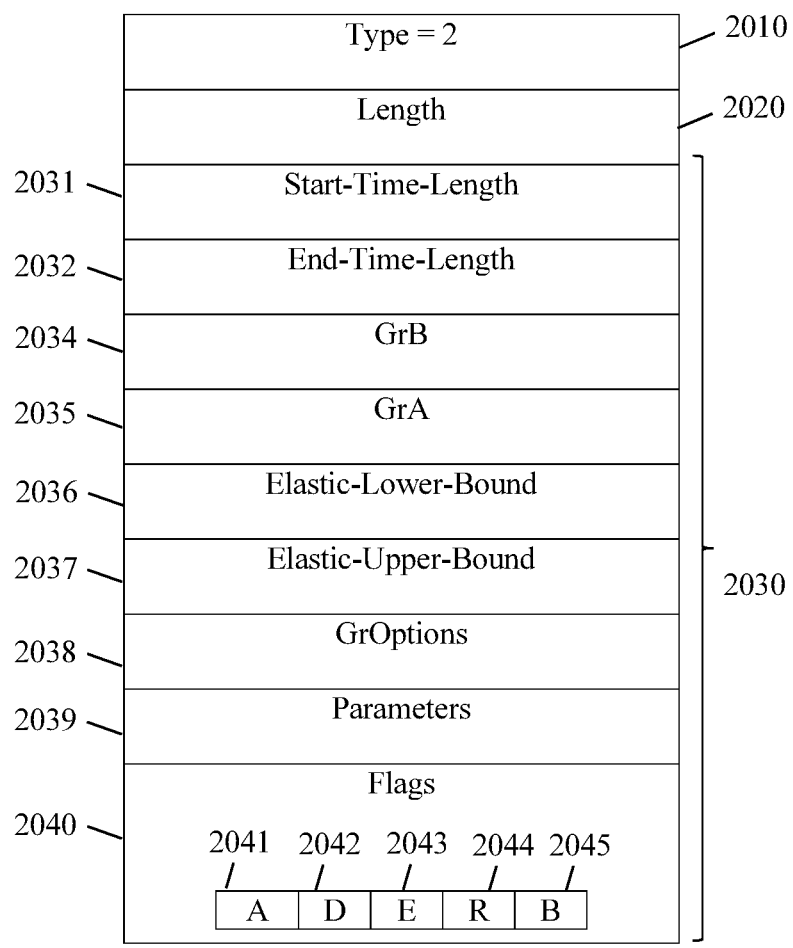
FIG. 20 is a schematic diagram illustrating an embodiment of a relative time interval TLV.

FIG. 20 is a schematic diagram illustrating an embodiment of a relative time interval TLV 2000. The TLV 2000 is employed by a PCE, such as the PCEs 110 in a domain, such as the domains 140 in the network 100, and a PCC of an ingress, such as the source network node 120 in the network 100, to indicate a time interval, such as the time intervals 420, 620, and 720 in the schemes 400, 600, and 700, that an LSP may carry traffic. The TLV 2000 may be included in a time-interval object 1800 of a PCReq message, a PCRep message, a PCInitiate message, and a PCRpt message. The TLV 2000 comprises a type field 2010, a length field 2020, and a TLV body 2030. The type field 2010 is about two octets long and is set to a value of two to indicate that the TLV 2000 is a relative time interval TLV. The length field 2020 is about two octets long and indicates a length of the TLV body 2030. The TLV body 2030 comprises a Start-Time-Length field 2031, an End-Time-Length field 2032, a GrB field 2034, a GrA field 2035, an Elastic-Lower-Bound field 2036, and an Elastic-Upper-Bound field 2037, a GrOptions field 2038, a Parameters field 2039 and a Flags field 2040. The Start-Time-Length field 2031 is about four octets long and indicates a time duration in seconds from a current local time to a time that an LSP starts to carry traffic. The End-Time-Length field 2032 is about four octets long and indicates a time duration in seconds from a current local time to a time that the LSP stops carrying traffic. The GrB field 2034, the GrA field 2035, the Elastic-Lower-Bound field 2036, the Elastic-Upper-Bound field 2037, the GrOptions field 2038, the Parameters field 2039 and the Flags field 2040 are similar to the GrB field 1934, the GrA field 1935, the Elastic-Lower-Bound field 1936, the Elastic-Upper-Bound field 1937, GrOptions field 1938, the Parameters field 1939 and the Flags field 1940 respectively. The Flags field 2040 comprises a flag A 2041 similar to the flag A 1941, a flag D 2042 similar to the flag D 1942, a flag E 2043 similar to the flag E 1943, a flag R 2044 similar to the flag R 1944, and a flag B 2045 similar to the flag B 1945, respectively.

Figure 21:
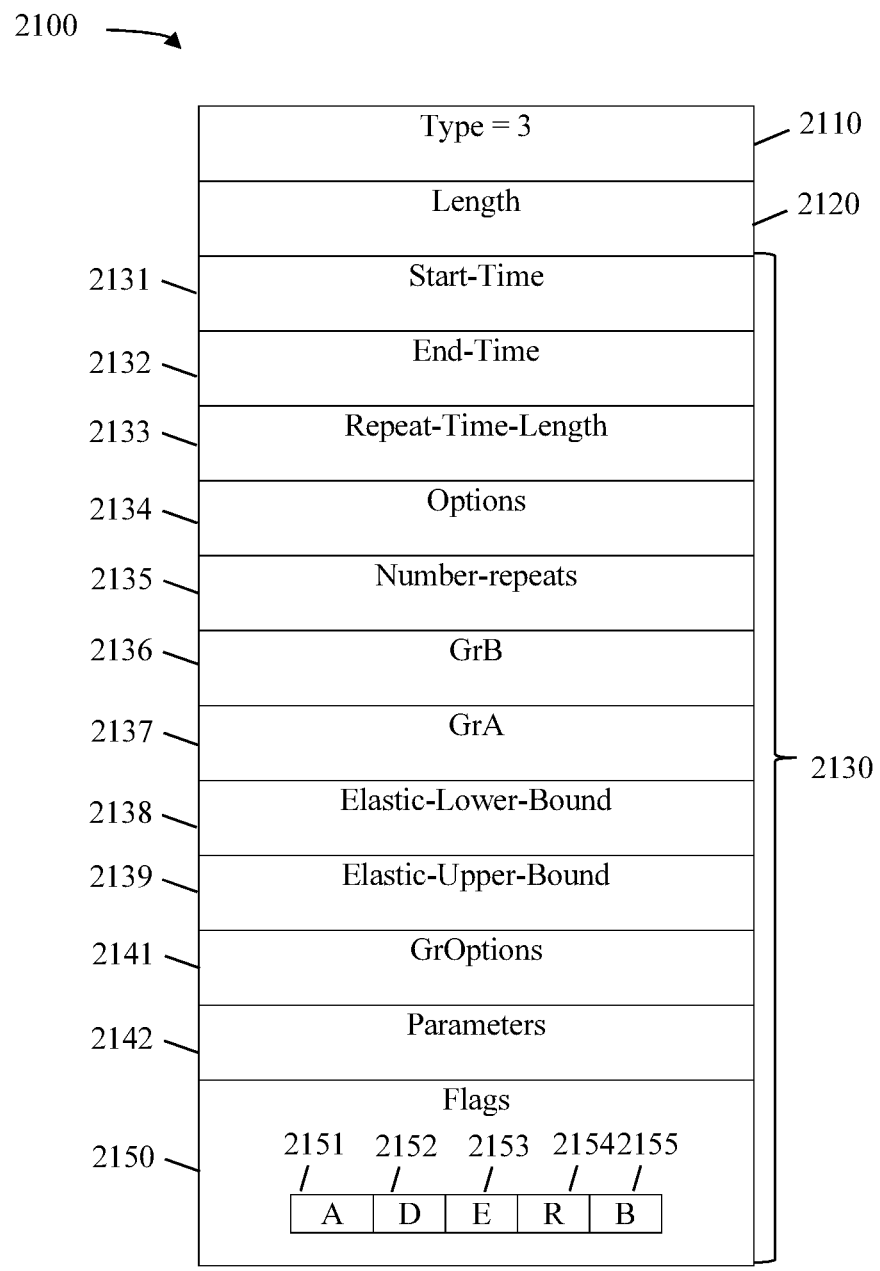
FIG. 21 is a schematic diagram illustrating an embodiment of a recurrent absolute time interval TLV.

FIG. 21 is a schematic diagram illustrating an embodiment of a recurrent absolute time interval TLV 2100. The TLV 2100 is employed by a PCE, such as the PCEs 110 in a domain, such as the domains 140 in the network 100, and a PCC of an ingress, such as the source network node 120 in the network 100, to indicate a series of time intervals, such as the time intervals 520, 620, and 720 in the schemes 500, 600, and 700, that an LSP may carry traffic. The TLV 2000 may be included in a time-interval object 1800 of a PCReq message, a PCRep message, a PCInitiate message, and a PCRtp message. The TLV 2100 comprises a type field 2110, a length field 2120, and a TLV body 2130. The type field 2110 is about two octets long and is set to a value of three to indicate that the TLV 2100 is a recurrent absolute time interval TLV. The length field 2120 is about two octets long and indicates a length of the TLV body 2130. The TLV body 2130 comprises a Start-Time field 2131, an End-Time field 2132, a Repeat-Time-Length field 2133, an Options field 2134, a Number-repeats field 2135, a GrB field 2136, a GrA field 2137, an Elastic-Lower-Bound field 2138, an Elastic-Upper-Bound field 2139, a GrOptions field 2141, a Parameters field 2142 and a Flags field 2150. The Start-Time field 2131 and the End-Time field 2132 are similar to the Start-Time field 1931 and the End-Time field 1932. The Repeat-Time-Length field 2133 is about four octets long and indicates a time duration in seconds between the start of each time intervals at which an LSP is scheduled for carrying to traffic. The Options field 2134 is about one octet long and indicates a repeat duration. For example, the Options field 2134 may be set to a value of 1 to indicate a per day repeat cycle. The Options field 2134 may be set to a value of 2 to indicate a per week repeat cycle. The Options field 2134 may be set to a value of 3 to indicate a per month repeat cycle. The Options field 2134 may be set to a value of 4 to indicate a per year repeat cycle. The Options field 2134 may be set to a value of 5 to indicate a repeat cycle according to the Repeat-Time-Length field 2133. The Number-repeats field 2135 is about three octets long and indicates a number of repeats for the scheduled time interval. The GrB field 2136, the GrA field 2137, the Elastic-Lower-Bound field 2138, and the Elastic-Upper-Bound field 2139 are similar to the GrB field 1934, the GrA field 1935, the Elastic-Lower-Bound field 1936, and the Elastic-Upper-Bound field 1937, respectively. It should be noted that the Repeat-Time-Length field 2133 is valid when the Options field 2134 is set to a value of 5. The GrOptions field 2141, the parameters field 2142 and the Flags field 2150 are similar to the GrOptions field 1938, the parameters field 1939 and the Flags field 1940, respectively. The Flags field 2140 comprises a flag A 2141 similar to the flag A 1941, a flag D 2142 similar to the flag D 1942, a flag E 2143 similar to the flag E 1943, a flag R 2144 similar to the flag R 1944, and a flag B 2145 similar to the flag B 1945, respectively.

Figure 22:
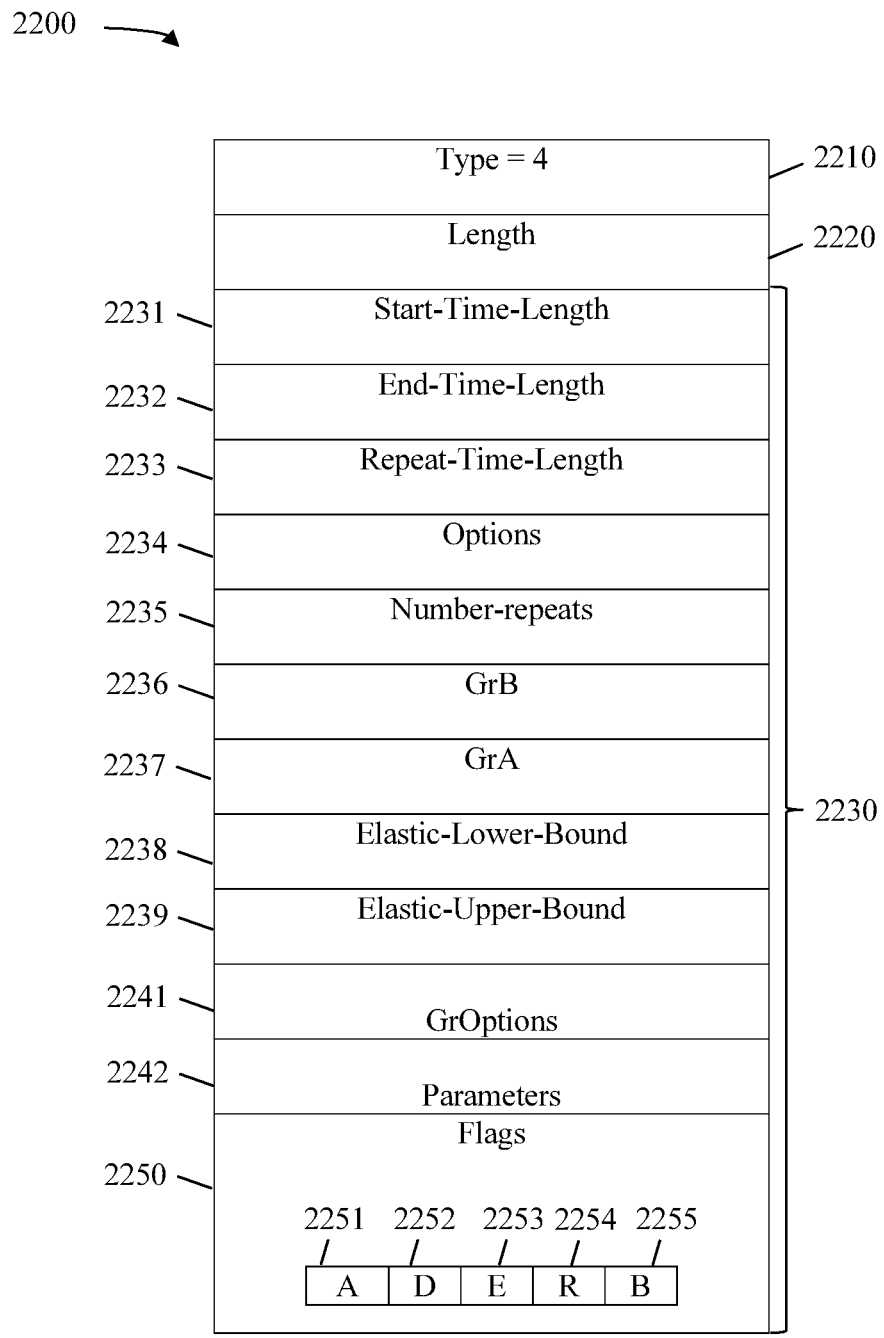
FIG. 22 is a schematic diagram illustrating an embodiment of a recurrent relative time interval TLV.

FIG. 22 is a schematic diagram illustrating an embodiment of a recurrent relative time interval TLV 2200. The TLV 2200 is employed by a PCE, such as the PCEs 110 in a domain, such as the domains 140 in the network 100, and a PCC of an ingress, such as the source network node 120 in the network 100, to indicate a series of time intervals, such as the time intervals 420, 520, 620, and 720 in the schemes 500, 600, and 700, that an LSP may carry traffic. The TLV 2000 may be included in a time-interval object 1800 of a PCReq message, a PCRep message, a PCInitiate message, and a PCRpt message. The TLV 2200 comprises a type field 2210, a length field 2220, and a TLV body 2230. The type field 2210 is about two octets long and is set to a value of four to indicate that the TLV 2200 is a recurrent relative time interval TLV. The length field 2220 is about two octets long and indicates a length of the TLV body 2230. The TLV body 2230 comprises a Start-Time-Length field 2231, an End-Time-Length field 2232, a Repeat-Time-Length field 2233, an Options field 2234, a Number-repeats field 2235, a GrB field 2236, a GrA field 2237, an Elastic-Lower-Bound field 2238, an Elastic-Upper-Bound field 2239, a GrOptions field 2241, a Parameters field 2242 and a Flags field 2250. The Start-Time-Length field 2231 and the End-Time-Length field 2232 are similar to the Start-Time-Length field 2031 and the End-Time-Length field 2032. The Repeat-Time-Length field 2233, the Options field 2234, and the Number-repeats field 2235 are similar to the Repeat-Time-Length field 2133, the Options field 2134, and the Number-repeats field 2135, respectively. The GrB field 2236, the GrA field 2237, the Elastic-Lower-Bound field 2238, the Elastic-Upper-Bound field 2239, the GrOptions field 2241, the Parameters field 2242 and the Flags field 2250 are similar to the GrB field 1934, the GrA field 1935, the Elastic-Lower-Bound field 1936, the Elastic-Upper-Bound field 1937, the GrOptions field 1938, the Parameters field 1939 and the Flags field 1940, respectively. The Flags field 2250 comprises a flag A 2251 similar to the flag A 1941, a flag D 2252 similar to the flag D 1942, a flag E 2253 similar to the flag E 1943, a flag R 2254 similar to the flag R 1944, and a flag B 2255 similar to the flag B 1945, respectively. It should be noted that the Repeat-Time-Length field 2233 is valid when the Options field 2234 is set to a value of 5.

Figure 23:
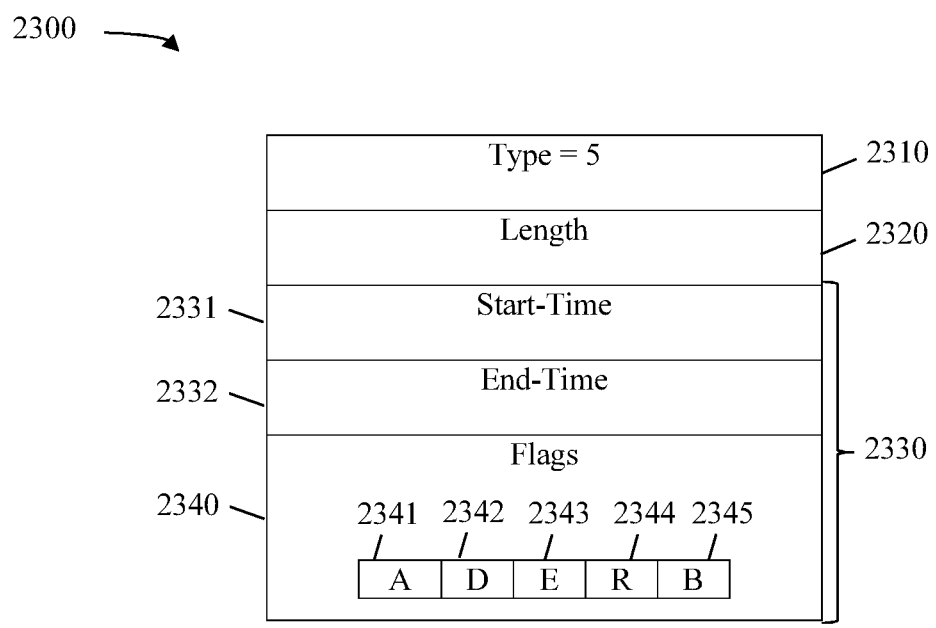
FIG. 23 is a schematic diagram illustrating an embodiment of a basic absolute time interval TLV.

FIG. 23 is a schematic diagram illustrating an embodiment of a basic absolute time interval TLV 2300. The TLV 2300 is employed by a PCE, such as the PCEs 110 in a domain, such as the domains 140 in the network 100, and a PCC of an ingress, such as the source network node 120 in the network 100, to indicate a time interval, such as the time interval 420 in the scheme 400 that an LSP may carry traffic. The TLV 2300 may be included in a time-interval object 1800 of a PCReq message, a PCRep message, a PCInitiate message, and a PCRpt message. The TLV 2300 comprises a type field 2310, a length field 2320, and a TLV body 2330. The type field 2310 is about two octets long and is set to a value of five to indicate that the TLV 2300 is a basic absolute time interval TLV. The length field 2320 is about two octets long and indicates a length of the TLV body 2330. The TLV body 2330 comprises a Start-Time field 2331, an End-Time field 2332 and a Flags field 2340. The Start-Time field 2331, the End-Time field 2332 and the Flags field 2340 are similar to the Start-Time field 1931, the End-Time field 1932, and the Flags field 1940, respectively. The Flags field 2340 comprises a flag A 2341 similar to the flag A 1941, a flag D 2342 similar to the flag D 1942, a flag E 2343 similar to the flag E 1943, a flag R 2344 similar to the flag R 1944, and a flag B 2345 similar to the flag B 1945, respectively.

Figure 24:
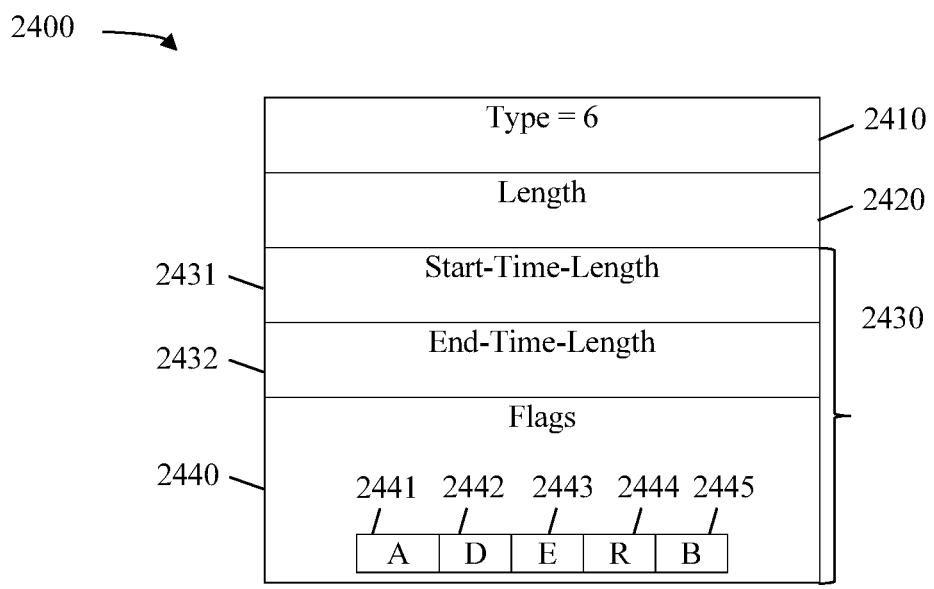
FIG. 24 is a schematic diagram illustrating an embodiment of a basic relative time interval TLV.

FIG. 24 is a schematic diagram illustrating an embodiment of a basic relative time interval TLV 2400. The TLV 2400 is employed by a PCE, such as the PCEs 110 in a domain, such as the domains 140 in the network 100, and a PCC of an ingress, such as the source network node 120 in the network 100, to indicate a time interval, such as the time interval 420 in the scheme 400 that an LSP may carry traffic. The TLV 2400 may be included in a time-interval object 1800 of a PCReq message, a PCRep message, a PCInitiate message, and a PCRpt message. The TLV 2400 comprises a type field 2410, a length field 2420, and a TLV body 2430. The type field 2410 is about two octets long and is set to a value of six to indicate that the TLV 2400 is a basic relative time interval TLV. The length field 2420 is about two octets long and indicates a length of the TLV body 2430. The TLV body 2430 comprises a Start-Time-Length field 2431, an End-Time-Length field 2432, and a Flags field 2440. The Start-Time-Length field 2431, the End-Time field-Length 2432 and a Flags field 2440 are similar to the Start-Time-Length field 2031, the End-Time-Length field 2032 and the Flags field 2040, respectively. The Flags field 2440 comprises a flag A 2441 similar to the flag A 1941, a flag D 2442 similar to the flag D 1942, a flag E 2443 similar to the flag E 1943, a flag R 2444 similar to the flag R 1944, and a flag B 2445 similar to the flag B 1945, respectively.

Figure 25:
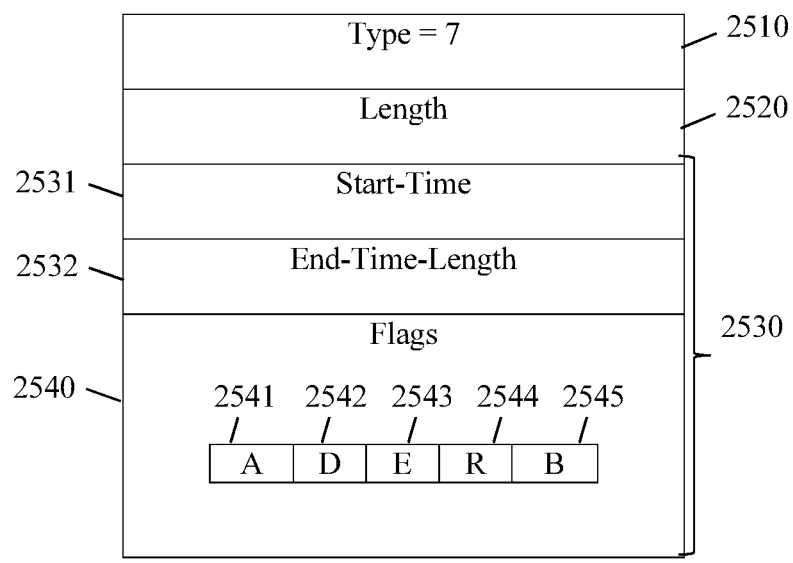
FIG. 25 is a schematic diagram illustrating an embodiment of a basic time interval TLV.

FIG. 25 is a schematic diagram illustrating an embodiment of a combined time interval TLV 2500. The TLV 2500 is employed by a PCE, such as the PCEs 110 in a domain, such as the domains 140 in the network 100, and a PCC of an ingress, such as the source network node 120 in the network 100, to indicate a time interval, such as the time interval 420 in the scheme 400 that an LSP may carry traffic. The TLV 2500 may be included in a time-interval object 1800 of a PCReq message, a PCRep message, a PCInitiate message, and a PCRpt message. The TLV 2500 comprises a type field 2510, a length field 2520, and a TLV body 2530. The type field 2510 is about two octets long and is set to a value of seven to indicate that the TLV 2500 is a combined time interval TLV. The length field 2520 is about two octets long and indicates a length of the TLV body 2530. The TLV body 2530 comprises a Start-Time field 2531, an End-Time-Length field 2532 and a Flags field 2540. The Start-Time field 2531, and the Flags field 2540 are similar to the Start-Time field 1931, and the Flags field 1940, respectively. The End-Time-Length indicates a time duration in seconds from the start time given by the Start-Time field to a time that the LSP stops carrying traffic. The Flags field 2540 comprises a flag A 2541 similar to the flag A 1941, a flag D 2542 similar to the flag D 1942, a flag E 2543 similar to the flag E 1943, a flag R 2544 similar to the flag R 1944, and a flag B 2545 similar to the flag B 1945, respectively.

Figure 26:
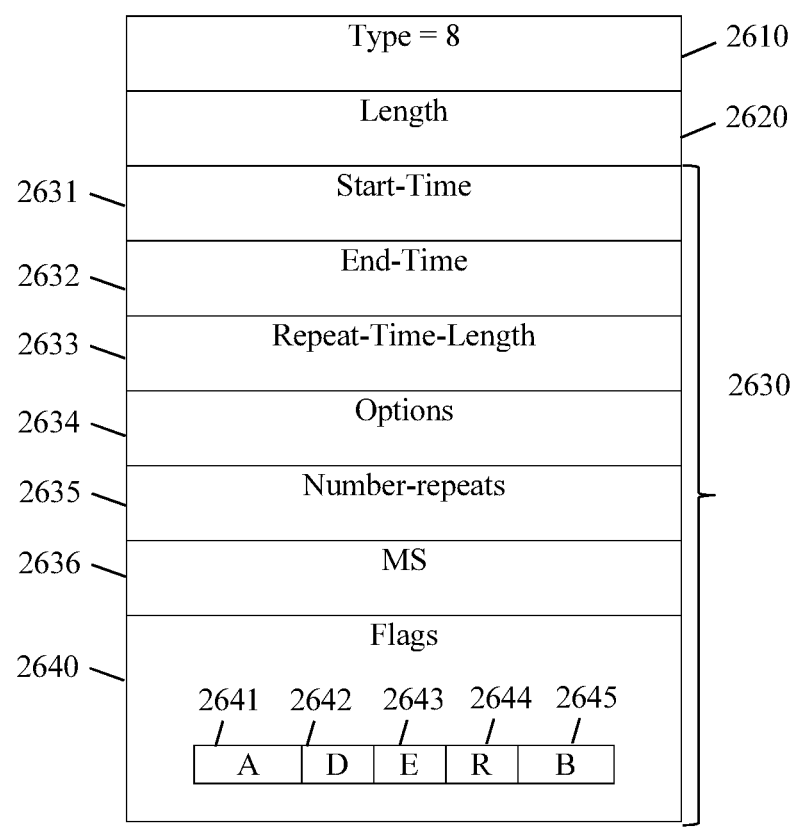
FIG. 26 is a schematic diagram illustrating an embodiment of a basic recurrent absolute time interval TLV.

FIG. 26 is a schematic diagram illustrating an embodiment of a basic recurrent absolute time interval TLV 2600. The TLV 2600 is employed by a PCE, such as the PCEs 110 in a domain, such as the domains 140 in the network 100, and a PCC of an ingress, such as the source network node 120 in the network 100, to indicate a series of time intervals, such as the time intervals 520 in the scheme 500, that an LSP may carry traffic. The TLV 2600 may be included in a time-interval object 1800 of a PCReq message, a PCRep message, a PCInitiate message, and a PCRpt message. The TLV 2600 comprises a type field 2610, a length field 2620, and a TLV body 2630. The type field 2610 is about two octets long and is set to a value of eight to indicate that the TLV 2600 is a basic recurrent absolute time interval TLV. The length field 2620 is about two octets long and indicates a length of the TLV body 2630. The TLV body 2630 comprises a Start-Time field 2631, an End-Time field 2632, a Repeat-Time-Length field 2633, an Options field 2634, a Number-repeats field 2635, a millisecond (MS) field 2636 and a Flags field 2640. The Start-Time field 2631 and the End-Time field 2632 are similar to the Start-Time field 1931 and the End-Time field 1932, respectively. The Repeat-Time-Length field 2633, the Options field 2634, the Number-repeats field 2635 and the Flags field 2640 are similar to the Repeat-Time-Length field 2133, the Options field 2134, the Number-repeats field 2135 and the Flags field 2150, respectively. The MS field 2636 may be about 10 bits long and may indicate be an extension to the Repeat-Time-Length field 2633. For example, the Repeat-Time-Length field 2633 and the MS field 2636 are combined to indicate a time duration in milliseconds between the start of each time intervals at which an LSP is scheduled for carrying traffic. The Flags field 2640 comprises a flag A 2641 similar to the flag A 1941, a flag D 2642 similar to the flag D 1942, a flag E 2643 similar to the flag E 1943, a flag R 2644 similar to the flag R 1944, and a flag B 2645 similar to the flag B 1945, respectively.

It should be noted that the Repeat-Time-Length field 2633 and the MS field 2636 are valid when the Options field 2634 is set to a value of 5.

Figure 27:
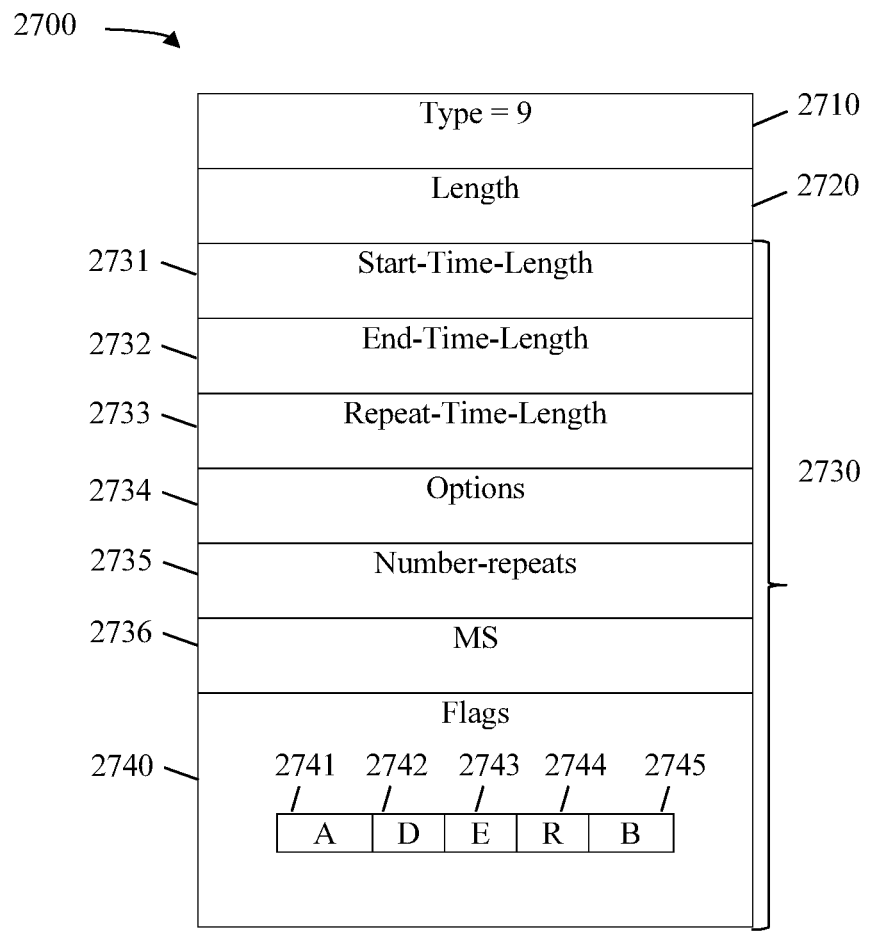
FIG. 27 is a schematic diagram illustrating an embodiment of a basic recurrent combined time interval TLV.

FIG. 27 is a schematic diagram illustrating an embodiment of a basic relative recurrent time interval TLV. The TLV 2700 is employed by a PCE, such as the PCEs 110 in a domain, such as the domains 140 in the network 100, and a PCC of an ingress, such as the source network node 120 in the network 100, to indicate a series of time intervals, such as the time intervals 520 in the scheme 500, that an LSP may carry traffic. The TLV 2700 may be included in a time-interval object 1800 of a PCReq message, a PCRep message, a PCInitiate message, and a PCRpt message. The TLV 2700 comprises a type field 2710, a length field 2720, and a TLV body 2730. The type field 2710 is about two octets long and is set to a value of nine to indicate that the TLV 2700 is a basic relative recurrent time interval TLV. The length field 2720 is about two octets long and indicates a length of the TLV body 2730. The TLV body 2730 comprises a Start-Time-Length field 2731, an End-Time-Length field 2732, a Repeat-Time-Length field 2733, an Options field 2734, a Number-repeats field 2735, an MS field 2736 and a Flags field 2740. The Start-Time-Length field 2731 and the End-Time-Length field 2732 are similar to the Start-Time-Length field 2031 and the End-Time-Length field 2032, respectively. The Repeat-Time-Length field 2733, the Options field 2734, the Number-repeats field 2735, the MS field 2736 and the Flags field 2740 are similar to the Repeat-Time-Length field 2133, the Options field 2134, the Number-repeats field 2135, the MS field 2636 and the Flags field 2640, respectively. The Flags field 2740 comprises a flag A 2741 similar to the flag A 1941, a flag D 2742 similar to the flag D 1942, a flag E 2743 similar to the flag E 1943, a flag R 2744 similar to the flag R 1944, and a flag B 2745 similar to the flag B 1945, respectively.

Figure 28:
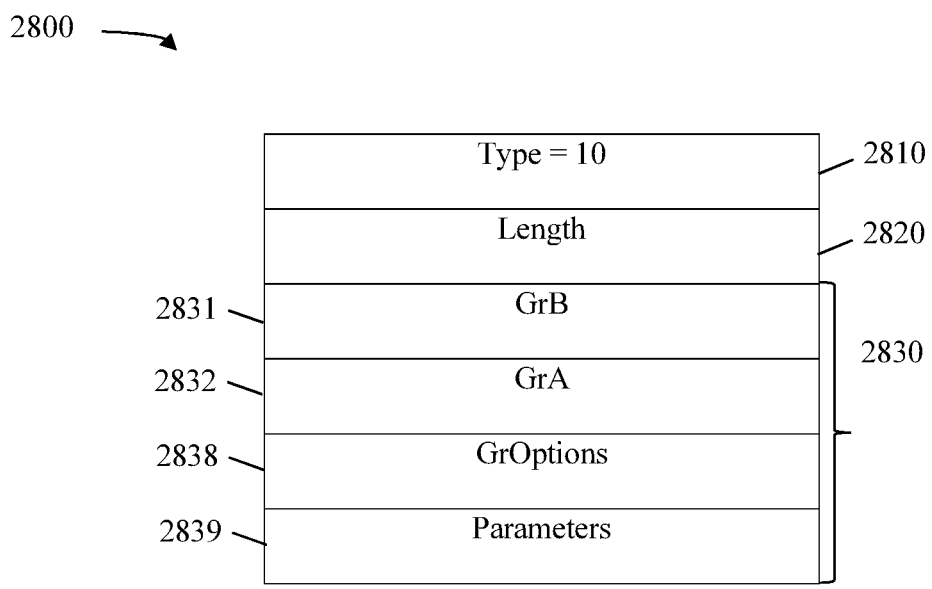
FIG. 28 is a schematic diagram illustrating an embodiment of a grace period TLV.

FIG. 28 is a schematic diagram illustrating an embodiment of a graceful period TLV 2800. The TLV 2800 is employed by a PCE, such as the PCEs 110 in a domain, such as the domains 140 in the network 100, and a PCC of an ingress, such as the source network node 120 in the network 100, to indicate graceful periods, such as the graceful periods 771 and 772 in the scheme 700. The TLV 2800 may be included in a time-interval object 1800 of a PCReq message, a PCRep message, a PCInitiate message, and a PCRpt message. The TLV 2800 may be included in a time-interval object 1800 in conjunction with the TLVs 2300, 2400, 2500, 2600, and/or 2700 to specify a schedule as shown in the schemes 500 and 600. The TLV 2800 comprises a type field 2810, a length field 2820, and a TLV body 2830. The type field 2810 is about two octets long and is set to a value of ten to indicate that the TLV 2800 is a graceful period TLV. The length field 2820 is about two octets long and indicates a length of the TLV body 2830. The TLV body 2830 comprises a GrB field 2831 a GrA field 2832, a GrOptions field 2838, and a Parameters field 2839. The GrB field 2831, the GrA field 2832 are similar to the GrB field 1934, the GrA field 1935, the GrOptions field 1938 and the Parameters field 1939, respectively.

Figure 29:
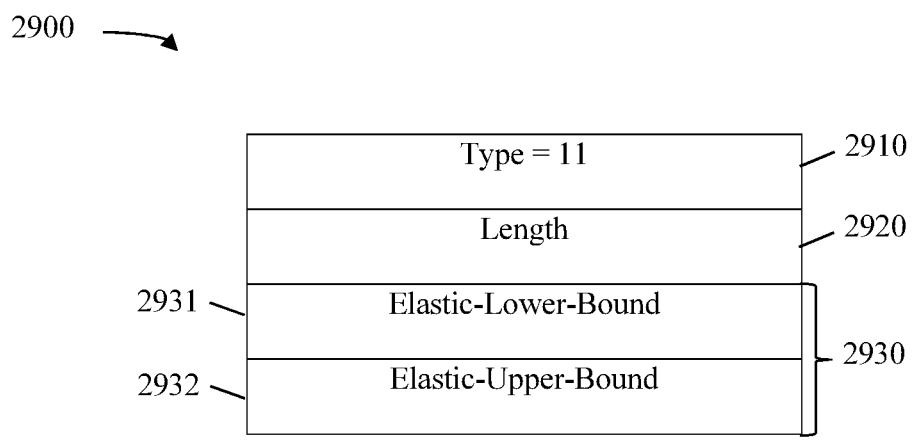
FIG. 29 is a schematic diagram illustrating an embodiment of an elastic range TLV.

FIG. 29 is a schematic diagram illustrating an embodiment of an elastic range TLV 2900. The TLV 2900 is employed by a PCE, such as the PCEs 110 in a domain, such as the domains 140 in the network 100, and a PCC of an ingress, such as the source network node 120 in the network 100, to indicate an elastic range, such as the elastic range 651 and 652 in the scheme 600. The TLV 2900 may be included in a time-interval object 1800 of a PCReq message, a PCRep message, a PCInitiate message, and a PCRpt message. The TLV 2900 may be included in a time-interval object 1800 in conjunction with the TLVs 2300, 2400, 2500, 2600, and/or 2700 to specify a schedule as shown in the schemes 400, 500, 600, and 700. The TLV 2900 comprises a type field 2910, a length field 2920, and a TLV body 2930. The type field 2910 is about two octets long and is set to a value of eleven to indicate that the TLV 2900 is an elastic range TLV. The length field 2920 is about two octets long and indicates a length of the TLV body 2930. The TLV body 2930 comprises an Elastic-Lower-Bound field 2931 and an Elastic-Upper-Bound field 2932. The Elastic-Lower-Bound field 2931 and the Elastic-Upper-Bound field 2932 are similar to the Elastic-Lower-Bound field 1936 and the Elastic-Upper-Bound field 1937, respectively.

In an embodiment, an OSPF associated with a PCE, such as the PCEs 110, may employ the TLV 1500 to advertise the PCE's path computation capabilities to enable PCCs and other PCEs to discover the PCE. Alternatively, the PCE may employ the TLV 1600 to exchange PCE capability information with other PCEs. Subsequently, the PCC and/or the PCE may employ any of the TLVs 1900, 2000, 2100, 2200 in a TLV 1800 to indicate a time schedule for an LSP, such as the LSP 150. For example, the time schedule may include one or more time intervals, such as the time intervals 420, 520, 620, and 720, graceful periods, such as the graceful periods 771 and 772, and/or an elastic range, such as the elastic range lower bound 651 and the elastic range upper bound 652. Alternatively, the PCC and/or the PCE may combine the TLVs 2800 and 2900 with any of the TLVs 2300, 2400, 2500, 2600, and 2700 in a TLV 1800 to indicate a time schedule for the an LSP. In addition, the PCC and/or the PCE may employ the RP object 1700 during a path computation request to indicate whether the path computation is for a P2MP temporal LSP or a P2P temporal LSP. It should be noted that the TLVs 1800-2800 may be employed for informational purpose. However, the TLVs 1800-2800 may also be suitable for employment in protocol signaling.

As described above, once an existing MPLS TE LSP is set up, it is assumed to carry traffic forever until it is down. When an MPLS TE LSP tunnel is up, it is assumed that the LSP consumes its reserved network resources forever even though the LSP may only use network resources during some period of time. As a result, the network resources are not used efficiently. Moreover, a tunnel service may not be reserved or booked in advance for a period of time or a sequence of time periods. The disclosed embodiments describe to the PCEP for initiating and maintaining an MPLS TE LSP in a period of time called a time interval or a sequence of time intervals. It is assumed that the LSP carries traffic during this time interval or each of these time intervals. Thus the network resources are efficiently used. More importantly, some new services may be provided. For example, a consumer may book a tunnel service in advance for a given time interval. Tunnel services may be scheduled.

A user configures a temporal LSP with a time interval or a sequence of time intervals. A simple time interval is a time period from time Ta to time Tb, which may be represented as [Ta, Tb]. When an LSP is configured with time interval [Ta, Tb], a path satisfying the constraints for the LSP in the time interval is computed and the LSP along the path is set up to carry traffic from time Ta to time Tb. In addition to simple time intervals, there are recurrent time intervals and elastic time intervals. Sometimes a simple time interval is called a time interval.

A recurrent time interval represents a series of repeated simple time intervals. A recurrent time interval has a simple time interval such as [Ta, Tb], a number of repeats such as 10 (e.g., repeats 10 times), and a repeat cycle/time such as a week (e.g., repeats every week). A recurrent time interval: "[Ta, Tb] repeats n times with repeat cycle C" represents n+1 simple time intervals as follows:

$$[Ta,Tb],[Ta+C,Tb+C],[Ta+2C,Tb+2C],\ldots,[Ta+nC,Tb+nC]$$

When an LSP is configured with a recurrent time interval such as "[Ta, Tb] repeats 10 times with a repeat cycle a week" (e.g., representing 11 simple time intervals), a path satisfying the constraints for the LSP in each of the simple time intervals represented by the recurrent time interval is computed and the LSP along the path is set up to carry traffic in each of the simple time intervals.

An elastic time interval is a time interval with an elastic range, which is represented as within $-P$ and $Q$, where P and Q is an amount of time such as 300 seconds. P is called elastic range lower bound and Q is called elastic range upper bound. For a simple time interval such as [Ta, Tb] with an elastic range, elastic time interval: "[Ta, Tb] within $-P$ and $Q$" means a time period from (Ta+X) to (Tb+X), where $-P<=X<=Q$.

When an LSP is configured with elastic time interval "[Ta, Tb] within $-P$ and $Q$", a path is computed such that the path satisfies the constraints for the LSP in the time period from (Ta+X) to (Tb+X) and $|X|$ is the minimum value, wherein X is from $-P$ to $Q$. That is that [Ta+X, Tb+X] is the time interval closest to time interval [Ta, Tb] within the elastic range. The LSP along the path is set up to carry traffic in the time period from (Ta+X) to (Tb+X).

Similarly, for a recurrent time interval with an elastic range, elastic time interval: "[Ta, Tb] repeats n times with repeat cycle C within $-P$ and $Q$" represents n+1 simple elastic time intervals as follows:

$$[Ta+X0,Tb+X0],[Ta+C+X1,Tb+C+X1],\ldots,[Ta+nC+Xn,Tb+nC+Xn],$$

where $-P<=Xi<=Q$, $i=0, 1, 2, \ldots, n$.

If a user wants to keep the same repeat cycle between any two adjacent time intervals, elastic time interval: "[Ta, Tb] repeats n times with repeat cycle C within $-P$ and Q SYNC" may be used, which represents n+1 simple elastic time intervals as follows:

$$[Ta+X,Tb+X],[Ta+C+X,Tb+C+X],\ldots,[Ta+nC+X,Tb+nC+X]$$

where $-P<=X<=Q$.

After a temporal LSP is configured, a user may change the temporal LSP's parameters including some of the time intervals configured. A new time interval may be added, an existing time interval may be removed or changed. When a new time interval is added to an existing LSP, a path satisfying the constraints for the LSP in the time interval is computed and the LSP along the path is set up to carry traffic in the time interval.

When an existing time interval is removed from an existing LSP, the time interval is deleted from the lifetime of the LSP. If the lifetime is over, the LSP is deleted.

A change to an existing time interval may generate some of four possible results: 1) The existing time interval is extended for a time period EA after the existing time period; 2) The existing time interval is extended for a time period EB before the existing time period; 3) The existing time interval is shrunk for a time period SA from the end of the existing time period; and 4) The existing time interval is shrunk for a time period SB from the beginning of the existing time period. When an existing time interval for an LSP is extended, a path satisfying the constraints for the LSP in the extended time interval is computed and the LSP along the path is set up to carry traffic in the extended time interval. If the LSP is already up to carry traffic in the existing time interval, the lifetime of the LSP is extended for time period EA following the existing time interval. When an existing time interval for an LSP is shrunk, the shrunk time periods are removed from the lifetime of the LSP.

For a temporal LSP, a user may want to have some graceful periods for each or some of the time intervals for the LSP. Two graceful periods may be configured for a time interval. One is the graceful period before the time interval, called grace-before, which extends the lifetime of the LSP for grace-before (e.g., such as 30 seconds) before the time interval. The other is the one after the time interval, called grace-after, which extends the lifetime of the LSP for grace-after (e.g., such as 60 seconds) after the time interval. When an LSP is configured with a simple time interval such as [Ta, Tb] with graceful periods such as GrB and GrA, a path is computed such that the path satisfies the constraints for the LSP in the time period from Ta to Tb. The LSP along the path is set up to carry traffic in the time period from (Ta−GB) to (Tb+GrA). During graceful periods from (Ta−GrB) to Ta and from Tb to (Tb+GrA), the LSP is up to carry traffic (e.g., maybe in best effort).

The following embodiments describe extensions to PCEP, OSPF and IS-IS for initiating and maintaining temporal LSPs. In an embodiment, there are a couple of options for advertising a PCE capability for initiating and maintaining temporal LSPs. The first option is to define a new flag in the OSPF and IS-IS PCE Capability Flags to indicate the capability that a PCE is capable to initiate and maintain temporal LSPs. This includes the capability of computing both a path for a temporal P2MP LSP and a path for a temporal P2P LSP. The second option is to define three new flags. The first new flag in the OSPF and IS-IS PCE Capability Flags indicates the capability that a PCE is capable to compute a path for a temporal P2MP LSP; the second new flag indicates the capability that a PCE is capable to compute a path for a temporal P2P LSP; and the third new flag indicates the capability that a PCE is capable to initiate and maintain a temporal LSP. The format of the PCE-CAP-FLAGS sub-TLV (e.g., the TLV 1500) comprises the following fields:

Type: 5
Length: Multiple of 4 octets
Value: This contains an array of units of 32-bit flags numbered from the most significant as bit zero, where each bit represents one PCE capability.

The following capability bits have been assigned by Internet assigned numbers authority (IANA):

| Bit | Capabilities |
| --- | --- |
| 0 | Path computation with GMPLS link constraints |
| 1 | Bidirectional path computation |
| 2 | Diverse path computation |
| 3 | Load-balanced path computation |
| 4 | Synchronized path computation |
| 5 | Support for multiple objective functions |
| 6 | Support for additive path constraints (max hop count, etc.) |
| 7 | Support for request prioritization |
| 8 | Support for multiple requests per message |
| 9 | Global Concurrent Optimization (GCO) |
| 10 | P2MP path computation |

The PCE-CAP-FLAGS sub-TLV may comprise Reserved bits, which are set to zero on transmission and are ignored on receipt.

For the second option, one bit such as bit 16 may be assigned to indicate that a PCE is capable to compute a path for a temporal P2MP LSP; another bit such as bit 17 may be assigned to indicate that a PCE is capable to compute a path for a temporal P2P LSP; and yet another bit such as bit 18 may be assigned to indicate that a PCE is capable to initiate and maintain temporal LSPs.

| Bit | Capabilities |
| --- | --- |
| 16 | Path computation for temporal P2MP LSP |
| 17 | Path computation for temporal P2P LSP |
| 18 | Initiation and maintenance of temporal LSP |
| 19-31 | Reserved for future assignments by IANA. |

If an OSPF does not advertise for a PCE's capability related to initiation and maintenance of a temporal LSP during discovery, PCEP may be used to allow a PCC to discover, during the Open Message Exchange, which PCEs are capable of supporting initiation and maintenance of a temporal LSP. To achieve this, a PCEP OPEN object may be extended by defining a new optional TLV (e.g., the TLV 1600) to indicate the PCE's capability to initiate and maintain a temporal LSP. For example, IANA may allocate a value such as 10 from the "PCEP TLV Type Indicators" subregistry. The description for the optional TLV is "temporal LSP capable", and the length value is 2 bytes. The value field is set to indicate the capability of a PCE for initiation and maintenance of a temporal LSP in details. The optional TLV may use flag bits in the value field in the same way as the PCE Capability Flags described above. The inclusion of the optional TLV in an OPEN object indicates that the sender may initiate and maintain a temporal LSP. The capability TLV is meaningful only for a PCE, so it will typically appear only in one of the two Open messages during PCE session establishment. However, in case of PCE cooperation (e.g., inter-domain), when a PCE behaving as a PCC initiates a PCE session it may also indicate its capabilities.

In an embodiment, a T bit is added in the flag bits field of an RP object (e.g., the RP object 1700) to tell a receiver of a message that the message is for (initiating and maintaining) a temporal LSP. For example, T (Temporal LSP bit—1 bit):
0: This indicates that this is not a message for a temporal LSP.
1: This indicates that this is a message for a temporal LSP.

This T bit with the N bit defined in IETF document RFC 6006 may indicate whether the message is for a temporal P2P LSP or P2MP LSP. For example, T=1 and N=0: This indicates that this is a message for a temporal P2P LSP
T=1 and N=1: This indicates that this is a message for a temporal P2MP LSP In an embodiment, a TIME-INTERVAL object (e.g., the time-interval object 1800) may comprise a Class field (e.g., with a value of 18), an OT field (e.g., with a value of 1), and a TIME-INTERVAL object body comprising a number of time interval TLVs. A time interval TLV may be a relative time interval TLV or an absolute time interval TLV, which are two different representations of a time interval. Their advantages and disadvantages are discussed further below.

The format of an absolute time interval TLV (Type=1) for an LSP is as shown in the TLV 1900. The absolute time interval TLV comprises a Start-time and an End-time, representing time interval [Start-time, End-time]. Both of these two times are the times that are synchronized among all the elements involved. Thus, the clocks on all the elements are synchronized if an absolute time interval TLV is used. The time period represented in an absolute time interval TLV is more accurate. In addition, the absolute time interval TLV comprises a non-zero grace-before and grace-after if graceful periods are configured. The absolute time interval TLV includes a non-zero elastic range lower bound and upper bound if there is an elastic range configured. The absolute time interval TLV's fields are as listed below:

Start-time: The time LSP starts to carry traffic.
End-time: The time LSP ends carrying traffic.
GrB: The graceful period time length in seconds before time interval [Start-time, End-time].
GrA: The graceful period time length in seconds after time interval [Start-time, End-time].
Elastic-Lower-Bound: The maximum amount of time in seconds that time interval [Start-time, End-time] may shift to lower/left.
Elastic-Upper-Bound: The maximum amount of time in seconds that time interval [Start-time, End-time] may shift to upper/right.

In another embodiment, an absolute time interval may be defined by three TLVs: 1) a basic absolute time interval TLV (e.g., the TLV 2300) comprising a Start-time and an End-time; 2) an elastic range TLV (e.g., the TLV 2900) comprising an elastic range lower bound and upper bound; and 3) a graceful period TLV (e.g., the TLV 2800) comprising a grace-before and a grace-after. If a time interval is with an elastic range, a basic absolute time interval TLV followed by an elastic range TLV is used. If a time interval is with graceful periods, a basic absolute time interval TLV followed by a graceful period TLV is used.

The format of a relative time interval TLV (Type=2) for an LSP is as shown in the TLV 2000. The relative time interval TLV comprises a Start-time-length and an End-time-length, representing the time interval below for the LSP:

[current-time+Start-time-length,current-time+End-time-length]

where current-time is a current local time.

When a time interval from time Ta to time Tb is configured on a node/element, these two time lengths are the time lengths that are computed on the node using a current local time as follows:

Start-time-length=$Ta$−current-time,

End-time-length=$Tb$−current-time.

For a relative time interval TLV, the clocks/times on all the elements involved maybe different. But the time period represented in a relative time interval TLV on one element/node may be shifted a little bit from another element's point of view since transmitting the TLV from one element to another takes a little time, which is hard to be considered accurately. The TLV also includes a non-zero grace-before and grace-after if graceful periods are configured. It contains a non-zero elastic range lower bound and upper bound if there is an elastic range configured. The relative time interval TLV's fields are as listed below:

Start-time-length: The time length in seconds from a current local time to the time LSP starts to carry traffic.
End-time-length: The time length in seconds from a current local time to the time LSP ends carrying traffic.
GrB: The graceful period time length in seconds before the time interval above for the LSP.
GrA: The graceful period time length in seconds after the time interval above for the LSP.
Elastic-Lower-Bound: The maximum amount of time in seconds that the time interval above for the LSP may shift to lower/left.
Elastic-Upper-Bound: The maximum amount of time in seconds that the time interval above may shift to upper/right.

The format of a recurrent absolute time interval TLV (Type=3) for an LSP is as shown in the TLV 2100. The recurrent absolute time interval TLV comprises a Start-time, an End-time, a Repeat-time-length, a Options field and a Number-repeats. The Start-time and End-time represents time interval [Start-time, End-time]. The Repeat-time-length represents a repeat cycle/time, which is valid if the Options field is set to indicate the way to repeat is "repeat every Repeat-time-length". The Options field indicates a way to repeat. The Number-repeats indicates the number of repeats of time interval [Start-time, End-time]. In addition, the TLV includes a non-zero grace-before and grace-after if graceful periods are configured. It contains a non-zero elastic range lower bound and upper bound if there is an elastic range configured. The recurrent absolute time interval TLV's fields are as listed below:

Start-time: The time LSP starts to carry traffic.
End-time: The time LSP ends carrying traffic.
Repeat-time-length: The time length in seconds after which LSP starts to carry traffic again for (End-time−Start-time).
Options: Indicates a way to repeat.
  Options=1: repeat every day;
  Options=2: repeat every week;
  Options=3: repeat every month;
  Options=4: repeat every year;
  Options=5: repeat every Repeat-time-length.
Number-repeats: The number of repeats. In each of repeats, LSP carries traffic.
GrB: The graceful period time length in seconds before time interval [Start-time, End-time].
GrA: The graceful period time length in seconds after time interval [Start-time, End-time].
Elastic-Lower-Bound: The maximum amount of time in seconds that time interval [Start-time, End-time] may shift to lower/left.
Elastic-Upper-Bound: The maximum amount of time in seconds that time interval [Start-time, End-time] may shift to upper/right.

The format of a recurrent relative time interval TLV (Type=4) for an LSP is as shown in the TLV 2200. The recurrent time interval TLV comprises a Start-time-length, an End-time-length, a Repeat-time-length, an Options field and a Number-repeats. The Start-time-length and End-time-length represents time interval [current-time+Start-time-length, current-time+End-time-length], where current-time is a current local time. The Repeat-time-length represents a repeat cycle/time, which is valid if the Options field is set to indicate the way to repeat is "repeat every Repeat-time-length". The Options field indicates a way to repeat. The Number-repeats indicates the number of repeats of the time interval above. In addition, the TLV includes a non-zero grace-before and grace-after if graceful periods are configured. It contains a non-zero elastic range lower bound and upper bound if there is an elastic range configured. The recurrent relative time interval TLV's fields are as listed below:

Start-time-length: The time length in seconds from a current local time to the time LSP starts to carry traffic.
End-time-length: The time length in seconds from a current local time to the time LSP ends carrying traffic.
Repeat-time-length: The time length in seconds after which LSP starts to carry traffic again for (End-time-length−Start-time-length).
Options: Indicates a way to repeat.
  Options=1: repeat every day;
  Options=2: repeat every week;
  Options=3: repeat every month;
  Options=4: repeat every year;
  Options=5: repeat every Repeat-time-length.
Number-repeats: The number of repeats. In each of repeats, LSP carries traffic.
GrB: The graceful period time length in seconds before time interval [current-time+Start-time-length, current-time+End-time-length].
GrA: The graceful period time length in seconds after time interval [current-time+Start-time-length, current-time+End-time-length].
Elastic-Lower-Bound: The maximum amount of time in seconds that time interval [current-time+Start-time-length, current-time+End-time-length] may shift to lower/left.
Elastic-Upper-Bound: The maximum amount of time in seconds that time interval [current-time+Start-time-length, current-time+End-time-length] may shift to upper/right.

The following embodiments discuss two classes of messages. One class is the messages between a PCE and a PCC on the ingress of a temporal LSP for initiating and maintaining the LSP. The other is the messages between two PCEs, one of which acts as a PCC.

For messages between PCE and PCC on Ingress, from function's point of view, there are four groups of messages: 1) LSP creation request messages, 2) LSP deletion request messages, 3) LSP creation response messages, and 4) LSP deletion response messages. A message for an LSP in the first two groups is sent from a PCE to the PCC on the ingress of the LSP. A message for an LSP in the last two groups is sent from the PCC on the ingress of the LSP to a PCE. A PCInitiate message with some extensions may be used for a message in the first two groups. A PCRpt message with some extensions may be used for a message in the last two groups. For an LSP creation request, a PCInitiate message includes objects: SRP, LSP, END-POINTS, ERO, GLSP-ID and TIME-INTERVAL. SRP object comprises an SRP-ID-number. LSP object comprises PLSP-ID of 0, and SYMBOLIC-PATH-NAME TLV with path name. END-POINTS object comprises the source and destination addresses of the LSP. ERO object comprise the path (i.e., ERO) for the LSP. GLSP-ID object comprises the global ID for the LSP. TIME-INTERVAL object comprises the time intervals for the LSP (the path satisfies constraints for the LSP in each of the time intervals).

For an LSP creation response, a PCRpt message includes objects: SRP, LSP, ERO, GLSP-ID and TIME-INTERVAL. SRP object comprises the SRP-ID-number in the corresponding LSP creation request message. LSP object comprises a PCEP-specific identifier for the LSP (PLSP-ID) assigned to the LSP by the PCC, SYMBOLIC-PATH-NAME TLV with path name, C Flag set to 1 indicates that this LSP is created by the LSP creation request. ERO object comprise the path (i.e., ERO) for the LSP. GLSP-ID object comprises the global ID for the LSP. TIME-INTERVAL object comprises the time intervals for the LSP.

For an LSP deletion request, a PCInitiate message includes objects: SRP, LSP, GLSP-ID, and TIME-INTERVAL. SRP object comprises an SRP-ID-number and R (remove) flag set to 1. LSP object comprises the PLSP-ID for the LSP created. GLSP-ID object comprises the global ID for the LSP. TIME-INTERVAL object comprises the time intervals for the LSP.

For an LSP deletion response, a PCRpt message includes objects: SRP, LSP, GLSP-ID, and TIME-INTERVAL. SRP object comprises the SRP-ID-number in the corresponding LSP deletion request message. LSP object comprises an R flag set to 1 indicating that the LSP has been removed from the PCC, and LSP Identifiers TLV. GLSP-ID object comprises the global ID for the LSP. TIME-INTERVAL object comprises the time intervals for the LSP.

It should be noted that the PCC on the ingress of an LSP does not use any time intervals in the TIME-INTERVAL object received for signaling the LSP. For just creating and deleting LSPs, a message may not need to include any TIME-INTERVAL object if the PCE creates the LSP with a sequence of time intervals at the beginning of each of the time intervals and deletes the LSP at the end of each of the time intervals.

For an LSP having a time interval TLV with graceful periods, LSP is created in the time period including the graceful periods and the LSP has the reserved bandwidth during that period (including the graceful periods). Alternatively, the LSP is created in the time period including the graceful periods, but bandwidth is not reserved for the LSP in the beginning. The desired bandwidth for the LSP is reserved in the time period without graceful periods.

After the graceful period before the time interval, the bandwidth for the LSP is reserved through an update message from the PCE to the PCC on the ingress of the LSP. After the time interval (e.g., just before the graceful period after the time interval), the bandwidth for the LSP is released through another update message from the PCE to the PCC on the ingress of the LSP.

For messages between two PCEs, the format of a request message with an optional TIME-INTERVAL object is as shown below:

```
<PCReq Message>::= <Common Header>
                    [<svec-list>]
                    <request-list>
<request-list>::=<request>[<request-list>]
<request>::= <RP> <END-POINTS> [<OF>] [<LSPA>]
             [<BANDWIDTH>] [<metric-list>] [<RRO>
             [<BANDWIDTH>]] [<IRO>] [<LOAD-BALANCING>]
             [<TIME-INTERVAL>][<GLSP-ID>]
```

Below is the format of a reply message with an optional TIME-INTERVAL object:

```
<PCRep Message>::= <Common Header>
                    <response-list>
<response-list>::=<response>[<response-list>]
<response>::= <RP>
              [<NO-PATH>]
              [<attribute-list>]
              [<path-list>]
<path-list>::=<path>[<path-list>]
<path>::= <ERO><attribute-list>[<TIME-INTERVAL>]
          [<GLSP-ID>]
```

The following embodiments focus on the procedures for creating and deleting a temporal LSP. When a PCE receives a request for an LSP with a sequence of time intervals from a user or application, it computes a path satisfying the constraints for the LSP in each of the time intervals and reserves the bandwidth for the LSP along the path in each of the time intervals. And then it initiates the creation of the LSP in the network to carry traffic in each of the time intervals.

There are a couple of ways for a PCE to create an LSP with a sequence of time intervals. One way is that the PCE initiates the creation of the LSP at the beginning of each of the time intervals. At the end of each of the time intervals or when a deletion request for the LSP is received, the PCE initiates the deletion of the LSP.

A procedure for creating a temporal LSP is as follows:
Step 1: A PCE receives a request for creating a temporal LSP from a user or application
Step 2: The PCE computes a shortest path satisfying constraints for the LSP in the time intervals given. It reserves the bandwidth in TEDB on each of the links the LSP traverses for each of the time intervals and stores the information about the LSP into an LSP database.
Step 3: At the beginning of each of the time intervals, the PCE initiates the setup of the LSP in a network through sending an LSP creation request (e.g., a PCInitiate with LSP object with PLSP-ID=0) with the path for the LSP to the PCC on the ingress of the LSP, which triggers RSVP-TE to signal the LSP along the path in the network (Note that the RSVP-TE is not aware of any time interval for the LSP and just sets up the LSP in a normal way). The PCC sends an LSP creation response (e.g., a PCRpt) to the PCE after the LSP is up.

Step 4: The PCE receives the LSP creation response (e.g., the PCRpt) from the PCC corresponding to the request and updates the status of the LSP accordingly.

Suppose that a temporal LSP has been created to carry traffic in a sequence of time intervals. A procedure for deleting this temporal LSP is as follows:

Step 1: A PCE receives a request for deleting the temporal LSP from a client, or the lifetime for the LSP in a time interval is over and the LSP needs to be deleted.

Step 2: The PCE finds the LSP in the LSP database and gets the information about the LSP.

Step 3: The PCE initiates the deletion of the LSP in the network through sending an LSP deletion request (e.g., a PCInitiate with R flag set and PLSP ID for the LSP) to the PCC on the ingress of the LSP, which triggers the RSVP-TE to tear down the LSP in the network (Note that the RSVP-TE is not aware of any time interval for the LSP and just tears down the LSP in a normal way). The PCC generates an LSP deletion response (e.g., a PCRpt with R flag set) and sends it to the PCE after the LSP is torn down.

Step 4: The PCE receives the LSP deletion response (e.g., the PCRpt) from the PCC corresponding to the request and updates the status of the LSP accordingly. For deleting the LSP completely as requested, it releases the bandwidth reserved for the LSP in TEDB for each of the time intervals and removes the information about the LSP from the LSP database after the LSP is deleted.

As described above in the scheme 200, TE information in a TEDB represents an unreserved bandwidth Bi at each of eight priority levels for a link at one point of time, for example, at the current time. This means that the link has bandwidth Bi at a priority level from now to forever until there is a change to it. Thus, a TE LSP tunnel for a given time interval may not be set up in advance using the information in the TEDB and the bandwidth may not be reserved in advance for the LSP in the time interval given.

A TEDB may be enhanced for supporting temporal LSPs. Two options for enhancing TEDB are presented below. Suppose that the amount of the unreserved bandwidth at a priority level for a link is Bj in a time interval from time Tj to Tk (k=j+1), where j=0, 1, 2, . . . . The unreserved bandwidth for the link may be represented as:

$$[T0,B0],[T1,B1],[T2,B2],[T3,B3],\ldots$$

This is an absolute time representation of bandwidths for a link. Time Tj (j=0, 1, 2, . . . ) is a synchronized time among all the elements involved.

If an LSP is completely deleted at time T and uses bandwidth B, then for every time interval/period (after time T) during which bandwidth B is reserved for the LSP on a link, B is added to the link for that interval/period.

If an LSP is to be up at time T and uses bandwidth B, then for every time interval/period (after time T) during which bandwidth B is reserved for the LSP on a link, B is subtracted from the link for that interval/period.

Alternatively, a relative time representation of bandwidths for a link may be used. For example, the amount of the unreserved bandwidth at a priority level for a link is Bj during a series of time intervals/periods may be expressed as:

$$[P0,B0],[P1,B1],[P2,B2],[P3,B3],\ldots,$$

where Pj=Tk−Tj, k=(j+1) and j=0, 1, 2, 3, . . . .

In this representation, every time Tj (j=0, 1, 2, . . . ) may be a local time. A timer may expire for every unit of time (e.g., every second) and may trigger—P0, which decrements P0. When P0=0, P1 becomes P0, P2 becomes P1, and so on.

If an LSP is completely deleted at time T and uses bandwidth B, then for every time interval/period (after time T) during which bandwidth B is reserved for the LSP on a link, B is added to the link for that interval/period.

If an LSP is to be up at time T and uses bandwidth B, then for every time interval/period (after time T) during which bandwidth B is reserved for the LSP on a link, B is subtracted from the link for that interval/period.

An advantage of using relative time representation is that the times or clocks on all the elements involved may be different.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed:

1. An apparatus comprising:
   a receiver configured to receive a request to perform path computation for a temporal label switched path (LSP), the request including a time interval scheduled for the temporal LSP to carry traffic in a network, wherein the request indicates a graceful time period adjacent to the time interval;
   a processor coupled to the receiver and a transmitter and configured to:
     compute a path in the network for the temporal LSP, the path satisfying a network constraint during the time interval; and
     reserve a network resource for the path computed for the temporal LSP, the network resource being reserved in advance of the time interval and the graceful time period to enable the temporal LSP to carry traffic during the time interval and the graceful time period; and
   the transmitter configured to send a response to a path computation client (PCC), the response including information of the computed path.

2. The apparatus of claim 1, wherein the time interval comprises a predetermined length of time, wherein the network resource is reserved from a time-based traffic engineering database (TEDB), and wherein the in-advance reservation does not comprise a reservation for the network resource at a current time.

3. The apparatus of claim 2, wherein the network resource is not reserved for the temporal LSP in the graceful period.

4. The apparatus of claim 2, wherein the time interval scheduled for the temporal LSP is associated with a global LSP identifier (GLSP-ID), wherein the receiver is further configured to receive a second request requesting a schedule modification for the time interval associated with the GLSP-ID, wherein the schedule modification comprises an extension to the time interval, a shrink to the time interval, a deletion of the time interval, or an addition of a new time interval, and wherein the processor is further configured to update the in-advance reservation according to the requested schedule modification.

5. The apparatus of claim 1, wherein the processor is further configured to initiate setup of the temporal LSP before the time interval to enable the temporal LSP to carry traffic in the time interval by:
   sending, via the transmitter, an LSP creation message to the PCC to request creation of the temporal LSP at a beginning of the time interval; and
   sending, via the transmitter, an LSP deletion message to the PCC to request deletion of the temporal LSP at an end of the time interval.

6. The apparatus of claim 1, wherein the request indicates a desired start time for the time interval and an elastic time range for the time interval, and wherein the processor is further configured to:
   compute the path for the temporal LSP by determining a minimum amount of time to shift the time interval from the desired start time such that a shifted time interval satisfies the network constraint and is temporally positioned within the elastic time range; and
   initiate setup of the temporal LSP before the shifted time interval to enable the temporal LSP to carry traffic during the shifted time interval.

7. The apparatus of claim 1, wherein the request indicates that the time interval is a recurring time interval with a repeat cycle, and wherein the processor is further configured to:
   compute the path for the temporal LSP, the path satisfying the network constraint during each recurring time interval;
   reserve a network resource for each recurring time interval on a link along the path; and
   initiate setup of the temporal LSP before the time interval to enable the temporal LSP to carry traffic during each recurring time interval.

8. The apparatus of claim 7, wherein the processor is further configured to initiate the setup of the temporal LSP before each recurring time interval by:
   sending, via the transmitter, an LSP creation message to the PCC to request creation of the temporal LSP at a beginning of each recurring time interval; and
   sending, via the transmitter, an LSP deletion message to the PCC to request deletion of the temporal LSP at an end of each recurring time interval.

9. The apparatus of claim 7, wherein the processor is further configured to initiate the setup of the temporal LSP before each recurring time interval by:
   sending, via the transmitter, an LSP creation message to the PCC to request creation of the temporal LSP at least prior to a beginning of a first-in-time time interval, wherein the LSP creation message indicates the recurring time interval and the repeat cycle;
   determining that a current time has reached an end of a last recurring time interval; and
   sending, via the transmitter, an LSP deletion message to the PCC to request deletion of the temporal LSP when determining that the current time has reached the end of the last recurring time interval.

10. The apparatus of claim 1, wherein the network is a multi-domain network, wherein the path is a shortest path computed across an autonomous system (AS) domain in the network, and wherein the AS domain is a source domain, a destination domain, or an intermediate transit domain of the temporal LSP.

11. The apparatus of claim 1, wherein the transmitter is further configured to transmit capability information of the apparatus to the PCC, the capability information indicating that the apparatus is capable of performing path computation for the temporal LSP.

12. An apparatus comprising:
   a processor configured to obtain one or more time intervals scheduled for a temporal label switched path (LSP) to carry traffic in a network;
   a receiver coupled to the processor and configured to receive capability information from a path computation element (PCE), the capability information indicating that the PCE is capable of performing path computation for the temporal LSP, the temporal LSP being an LSP that is scheduled to carry traffic in a network during a time interval; and
   a transmitter coupled to the processor and configured to send a request to the PCE in response to receiving the capability information from the PCE, the request requesting for path computation for the temporal LSP according to the time interval and a network constraint, wherein the request indicates a graceful time period adjacent to the time interval, and
   the receiver being further configured to receive path information from the PCE indicating a path for the temporal LSP satisfying the network constraint during the time interval and an in-advance reservation of a network resource along the path for the temporal LSP during the time interval, wherein the graceful time period enables the temporal LSP to carry traffic during the time interval and the graceful time period.

13. The apparatus of claim 12, wherein the processor is further configured to:
   receive, via the receiver, an LSP creation initiate request (PCInitiate) message at a beginning of each time interval requesting creation of the temporal LSP along the path;
   initiate setup of the temporal LSP at each node along the path in response to each LSP creation PCInitiate message;
   receive, via the receiver, an LSP deletion PCInitiate message at an end of each time interval requesting deletion of the temporal LSP along the path; and
   initiate teardown of the temporal LSP at each node along the path in response to each LSP deletion PCInitiate message.

14. The apparatus of claim 12, wherein the processor is further configured to:
   receive, via the receiver, an LSP creation initiate request (PCInitiate) message at least prior to a beginning of a first time interval requesting creation of the temporal LSP along the path, wherein the creation PCInitiate message indicates timing information associated with the time intervals;
   set an LSP flag to an active state at a beginning of each time interval to indicate that the temporal LSP is scheduled for carrying the traffic;

set the LSP flag to an inactive state at an end of each time interval to indicate that the temporal LSP is not scheduled for carrying the traffic; and receive, via the receiver, a deletion PCInitiate message at an end of a last time interval requesting deletion of the temporal LSP along the path.

15. A method comprising:

transmitting, by a path computation element (PCE), capability information of the PCE to a path computation client (PCC), the capability information indicating that the PCE supports path computation for a temporal label switched path (LSP), the temporal LSP being an LSP that is scheduled to carry traffic in a network during a time interval;

receiving, by the PCE, a request for creating the temporal LSP during the time interval in response to transmitting the capability information of the PCE to the PCC, wherein the request indicates a graceful time period adjacent to the time interval;

computing, by the PCE, a shortest path in a network satisfying a network constraint for the temporal LSP during the time interval;

reserving, by the PCE, a bandwidth for the temporal LSP along the shortest path during the time interval; and initiating, by the PCE, creation of the temporal LSP in the network before the time interval and the graceful time period to carry traffic during the time interval and the graceful time period.

16. The method of claim 15, further comprising sending, by the PCE, a PCE session establishment message comprising:

a first PCE capability flag indicating whether the PCE is capable of computing a first path for a temporal point-to-multipoint (P2MP) LSP; and a second PCE capability flag indicating whether the PCE is capable of computing a second path for a temporal point-to-point (P2P) LSP.

17. The method of claim 15, wherein the time interval is a time period from a first time, denoted as Ta, to a second time, denoted as Tb, wherein the request is a PCE communication protocol (PCEP) path computation request (PCReq) message comprising a time-interval object, wherein the time-interval object comprises:

a Start-Time field indicating the first time that the temporal LSP starts to carry traffic; and an End-Time field indicating the second time that the temporal LSP ends carrying the traffic, and wherein the first time and the second time are clock times that are synchronized among all network elements (NEs) in the network.

18. The method of claim 15, wherein the time interval is a time period from a first time, denoted as Ta, to a second time, denoted as Tb, wherein the request is a PCE communication protocol (PCEP) path computation request (PCReq) message comprising a time-interval object, and wherein the time-interval object comprises:

a Start-time-length field indicating a Start-time length in seconds from a current local clock time to the first time Ta that the temporal LSP starts to carry traffic, wherein the Start-time length = Ta - current local clock time; and an End-time-length field indicating an End-time length in seconds from the current local clock time to the second time Tb that the temporal LSP ends carrying the traffic, wherein the End-time length = Tb - current local clock time.

19. The method of claim 15, wherein the time interval is a recurrent time interval that the temporal LSP carries traffic, wherein the request is a PCE communication protocol (PCEP) path computation request (PCReq) message comprising a time-interval object, and wherein the time-interval object comprises:

a Number-repeats field indicating a number of repeats;

a Repeat-time-length field indicating a repeat-time length in seconds of a repeat cycle for the recurrent time interval; and an Options field indicating whether the recurrent time interval repeats every day, every week, every month, every year, or repeats every repeat-time length.

20. The method of claim 15, wherein the request is a PCE communication protocol (PCEP) path computation request (PCReq) message comprising a time-interval object, wherein the time-interval object comprises:

a Grace-Before (GrB) field indicating a first graceful period time length in seconds before the time interval; and a Grace-After (GrA) field indicating a second graceful period time length in seconds after the time interval, and wherein the first graceful period and the second graceful period are for the temporal LSP to carry traffic according to best-effort routing.

21. The method of claim 15, wherein the request is a PCE communication protocol (PCEP) path computation request (PCReq) message comprising a time-interval object, wherein the time-interval object comprises:

an Elastic-Lower-Bound field indicating a first maximum amount of time in seconds, denoted as P, that the time interval is allowed to shift to an earlier time than a start time, denoted as Ta; and an Elastic-Upper-Bound field indicating a second maximum amount of time in seconds, denoted as Q, that the time interval is allowed to shift to a later time than an end time, denoted as Tb, wherein the shortest path is computed such that the shortest path satisfies the constraint in a time period from a first time, Ta+x, to a second time, Tb+x, wherein x is a value from −P to Q, and wherein an absolute value of x is a minimum value from 0 to a maximum of P and Q.

22. A method, comprising:

receiving, by a path computation element (PCE), a request to perform path computation for a temporal label switched path (LSP), the request including a time interval scheduled for the temporal LSP to carry traffic in a network, wherein the request indicates a graceful time period adjacent to the time interval;

computing, by the PCE, a path in the network for the temporal LSP, the path satisfying a network constraint during the time interval;

reserving, by the PCE, a network resource for the path computed for the temporal LSP, the network resource being reserved in advance for of the time interval and the graceful time period to enable the temporal LSP to carry traffic during the time interval and the graceful time period; and sending, by the PCE, a response to a path computation client (PCC), the response including information of the computed path.

23. The method of claim 22, further comprising:
transmitting, by the PCE, capability information of the PCE to the PCC, the capability information indicating that the PCE is capable of performing path computation for the temporal LSP.

24. The method of claim 22, wherein the time interval comprises a predetermined length of time, wherein the network resource is reserved from a time-based traffic engineering database (TEDB), and wherein the in-advance reservation does not comprise a reservation for the network resource at a current time.

25. The method of claim 22, further comprising:
sending, by the PCE, an LSP creation message to the PCC to request creation of the temporal LSP at a beginning of the time interval; and
sending, by the PCE, an LSP deletion message to the PCC to request deletion of the temporal LSP at an end of the time interval.

\* \* \* \* \*

UNITED STATES PATENT AND TRADEMARK OFFICE
CERTIFICATE OF CORRECTION

PATENT NO. : 10,498,640 B2
APPLICATION NO. : 14/846450
DATED : December 3, 2019
INVENTOR(S) : Huaimo Chen et al.

It is certified that error appears in the above-identified patent and that said Letters Patent is hereby corrected as shown below:

In the Claims

Column 42, Lines 48-67, Claim 22 should read:
22. A method, comprising:
    receiving, by a path computation element (PCE), a request to perform path computation for a temporal label switched path (LSP), the request including a time interval scheduled for the temporal LSP to carry traffic in a network, wherein the request indicates a graceful time period adjacent to the time interval;
    computing, by the PCE, a path in the network for the temporal LSP, the path satisfying a network constraint during the time interval;
    reserving, by the PCE, a network resource for the path computed for the temporal LSP, the network resource being reserved in advance of the time interval and the graceful time period to enable the temporal LSP to carry traffic during the time interval and the graceful time period; and
    sending, by the PCE, a response to a path computation client (PCC), the response including information of the computed path.

Signed and Sealed this
Twenty-eighth Day of January, 2020

Andrei Iancu
*Director of the United States Patent and Trademark Office*